US011940550B2

(12) United States Patent
Mai et al.

(10) Patent No.: US 11,940,550 B2
(45) Date of Patent: Mar. 26, 2024

(54) METHOD, APPARATUS, AND SYSTEM FOR WIRELESS MONITORING TO ENSURE SECURITY

(71) Applicants: Chao-Lun Mai, Cambridge, MA (US); Dan Bugos, Washington, DC (US); Hung-Quoc Duc Lai, Parkville, MD (US); Spencer Maid, Danvers, MA (US); Beibei Wang, Clarksville, MD (US); Oscar Chi-Lim Au, San Jose, CA (US); K. J. Ray Liu, Potomac, MD (US)

(72) Inventors: Chao-Lun Mai, Cambridge, MA (US); Dan Bugos, Washington, DC (US); Hung-Quoc Duc Lai, Parkville, MD (US); Spencer Maid, Danvers, MA (US); Beibei Wang, Clarksville, MD (US); Oscar Chi-Lim Au, San Jose, CA (US); K. J. Ray Liu, Potomac, MD (US)

(73) Assignee: ORIGIN WIRELESS, INC., Rockville, MD (US)

( * ) Notice: Subject to any disclaimer, the term of this patent is extended or adjusted under 35 U.S.C. 154(b) by 0 days.

(21) Appl. No.: 17/352,306

(22) Filed: Jun. 20, 2021

(65) Prior Publication Data
US 2021/0311162 A1 Oct. 7, 2021

Related U.S. Application Data

(63) Continuation-in-part of application No. 15/326,112, filed as application No. PCT/US2015/041037 on Jul.
(Continued)

(51) Int. Cl.
G01S 7/00 (2006.01)
G01S 7/41 (2006.01)
(Continued)

(52) U.S. Cl.
CPC .............. *G01S 7/006* (2013.01); *G01S 7/415* (2013.01); *G01S 13/003* (2013.01); *G01S 13/56* (2013.01); *H04W 84/18* (2013.01)

(58) Field of Classification Search
CPC ........ G01S 13/003; G01S 13/56; G01S 7/006; G01S 7/415; H04W 84/18
See application file for complete search history.

(56) References Cited

U.S. PATENT DOCUMENTS 9,304,184 B1 * 4/2016 Draganov ............... G01S 19/47
10,289,917 B1 * 5/2019 Fu .................... G08B 13/19602
(Continued)

FOREIGN PATENT DOCUMENTS

JP 2004310536 * 11/2004 ............ G08B 23/00

OTHER PUBLICATIONS

Wu et al., "Non-invasive detection of moving and stationary human with WiFi", May 2015, IEEE Journal on Selected Areas in Communications, vol. 33, No. 11, pp. 2329-2342 (Year: 2015).*

Primary Examiner — Zhiyu Lu

(57) ABSTRACT

Methods, apparatus and systems for wireless motion monitoring to ensure security are described. In one example, a described system comprises: a transmitter configured for transmitting a first wireless signal through a wireless multipath channel of a venue; a receiver configured for receiving a second wireless signal through the wireless multipath channel; and a processor. The second wireless signal differs from the first wireless signal due to the wireless multipath channel and a motion of an object in the venue. The processor is configured for: obtaining a time series of channel information (TSCI) of the wireless multipath channel based on the second wireless signal; computing a spatial-temporal information (STI) based on the TSCI; monitoring the motion of the object based on the TSCI and the STI;
(Continued)

performing a task based on the monitoring; and generating a response based on the task.

30 Claims, 10 Drawing Sheets

Related U.S. Application Data 17, 2015, application No. 17/352,306 is a continuation-in-part of application No. 16/127,151, filed on Sep. 10, 2018, now Pat. No. 11,012,285, which is a continuation-in-part of application No. PCT/US2017/021963, filed on Mar. 10, 2017, application No. 17/352,306, filed on Jun. 20, 2021 is a continuation-in-part of application No. 16/667,757, filed on Oct. 29, 2019, and a continuation-in-part of application No. 16/790,610, filed on Feb. 13, 2020, and a continuation-in-part of application No. 16/790,627, filed on Feb. 13, 2020, and a continuation-in-part of application No. 16/798,343, filed on Feb. 22, 2020, which is a continuation-in-part of application No. 16/871,000, filed on May 10, 2020, and a continuation-in-part of application No. 16/871,004, filed on May 10, 2020, and a continuation-in-part of application No. 16/871,006, filed on May 10, 2020, and a continuation-in-part of application No. 16/909,913, filed on Jun. 23, 2020, and a continuation-in-part of application No. 16/909,940, filed on Jun. 23, 2020, and a continuation-in-part of application No. 16/945,827, filed on Aug. 1, 2020, and a continuation-in-part of application No. 16/945,837, filed on Aug. 1, 2020, and a continuation-in-part of application No. 17/019,273, filed on Sep. 13, 2020, and a continuation of application No. 17/019,271, filed on Sep. 13, 2020, and a continuation-in-part of application No. 17/019,270, filed on Sep. 13, 2020, and a continuation-in-part of application No. 17/113,024, filed on Dec. 5, 2020, now Pat. No. 11,202,215, and a continuation-in-part of application No. 17/113,023, filed on Dec. 5, 2020, and a continuation-in-part of application No. 17/149,625, filed on Jan. 14, 2021, which is a continuation-in-part of application No. 16/667,648, filed on Oct. 29, 2019, now Pat. No. 11,035,940, which is a continuation-in-part of application No. 16/446,589, filed on Jun. 19, 2019, now Pat. No. 10,742,475, which is a continuation-in-part of application No. 16/101,444, filed on Aug. 11, 2018, now Pat. No. 10,291,460, application No. 17/352,306, filed on Jun. 20, 2021 is a continuation-in-part of application No. 17/149,667, filed on Jan. 14, 2021, and a continuation-in-part of application No. 17/180,763, filed on Feb. 20, 2021, and a continuation-in-part of application No. 17/180,762, filed on Feb. 20, 2021, and a continuation-in-part of application No. 17/180,760, filed on Feb. 20, 2021, now Pat. No. 11,181,486, and a continuation-in-part of application No. 17/180,766, filed on Feb. 20, 2021, and a continuation-in-part of application No. 17/214,838, filed on Mar. 27, 2021, and a continuation-in-part of application No. 17/214,841, filed on Mar. 27, 2021, and a continuation-in-part of application No. 17/214,836, filed on Mar. 27, 2021, which is a continuation-in-part of application No. 17/352,185, filed on Jun. 18, 2021.

(60) Provisional application No. 63/001,226, filed on Mar. 27, 2020, provisional application No. 63/038,037, filed on Jun. 11, 2020, provisional application No. 63/087,122, filed on Oct. 2, 2020, provisional application No. 63/090,670, filed on Oct. 12, 2020, provisional application No. 63/104,422, filed on Oct. 22, 2020, provisional application No. 63/112,563, filed on Nov. 11, 2020, provisional application No. 63/209,907, filed on Jun. 11, 2021.

(51) Int. Cl.
*G01S 13/00* (2006.01)
*G01S 13/56* (2006.01)
*H04W 84/18* (2009.01)

(56) References Cited

U.S. PATENT DOCUMENTS

| | | | | |
|---|---|---|---|---|
| 10,852,411 | B2* | 12/2020 | Kravets | G01S 13/56 |
| 2004/0047153 | A1* | 3/2004 | Lee | G08B 13/19 |
| | | | | 362/276 |
| 2015/0276237 | A1* | 10/2015 | Daniels | F24D 19/1009 |
| | | | | 237/2 A |
| 2015/0379836 | A1* | 12/2015 | Nye | G08B 13/02 |
| | | | | 340/565 |
| 2017/0045864 | A1* | 2/2017 | Fadell | G05B 15/02 |
| 2017/0074980 | A1* | 3/2017 | Adib | G01S 7/354 |

* cited by examiner

METHOD, APPARATUS, AND SYSTEM FOR WIRELESS MONITORING TO ENSURE SECURITY

CROSS-REFERENCE TO RELATED APPLICATIONS

The present application hereby incorporates by reference the entirety of the disclosures of, and claims priority to, each of the following cases:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019,
(d) U.S. patent application Ser. No. 16/790,610, entitled "METHOD, APPARATUS, AND SYSTEM FOR WIRELESS GAIT RECOGNITION", filed Feb. 13, 2020,
(e) U.S. patent application Ser. No. 16/790,627, entitled "METHOD, APPARATUS, AND SYSTEM FOR OUTDOOR TARGET TRACKING", filed Feb. 13, 2020.
(f) U.S. patent application Ser. No. 16/798,343, entitled "METHOD, APPARATUS, AND SYSTEM FOR WIRELESS OBJECT TRACKING", filed Feb. 22, 2020,
(g) U.S. Provisional Patent application 63/001,226, entitled "METHOD, APPARATUS, AND SYSTEM FOR IMPROVED WIRELESS MONITORING AND USER INTERFACE", filed on Mar. 27, 2020,
(h) U.S. patent application Ser. No. 16/871,000, entitled "METHOD, APPARATUS, AND SYSTEM FOR WIRELESS TRACKING WITH GRAPH-BASED PARTICLE FILTERING", filed on May 10, 2020,
(i) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(j) U.S. patent application Ser. No. 16/871,006, entitled "METHOD, APPARATUS, AND SYSTEM FOR VITAL SIGNS MONITORING USING HIGH FREQUENCY WIRELESS SIGNALS", filed on May 10, 2020,
(k) U.S. Provisional Patent application 63/038,037, entitled "METHOD, APPARATUS, AND SYSTEM FOR MOTION LOCALIZATION, WALKING DETECTION AND DEVICE QUALIFICATION", filed on Jun. 11, 2020,
(l) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
(m) U.S. patent application Ser. No. 16/909,940, entitled "METHOD, APPARATUS, AND SYSTEM FOR QUALIFIED WIRELESS SENSING", filed on Jun. 23, 2020,
(n) U.S. patent application Ser. No. 16/945,827, entitled "METHOD, APPARATUS, AND SYSTEM FOR PROCESSING AND PRESENTING LIFE LOG BASED ON A WIRELESS SIGNAL", filed on Aug. 1, 2020,
(o) U.S. patent application Ser. No. 16/945,837, entitled "METHOD, APPARATUS, AND SYSTEM FOR WIRELESS SLEEP MONITORING", filed on Aug. 1, 2020,
(p) U.S. patent application Ser. No. 17/019,273, entitled "METHOD, APPARATUS, AND SYSTEM FOR AUTOMATIC AND ADAPTIVE WIRELESS MONITORING AND TRACKING", filed on Sep. 13, 2020,
(q) U.S. patent application Ser. No. 17/019,271, entitled "METHOD, APPARATUS, AND SYSTEM FOR POSITIONING AND POWERING A WIRELESS MONITORING SYSTEM", filed on Sep. 13, 2020,
(r) U.S. patent application Ser. No. 17/019,270, entitled "METHOD, APPARATUS, AND SYSTEM FOR VEHICLE WIRELESS MONITORING", filed on Sep. 13, 2020,
(s) U.S. Provisional Patent application 63/087,122, entitled "METHOD, APPARATUS, AND SYSTEM FOR WIRELESS TRACKING", filed on Oct. 2, 2020,
(t) U.S. Provisional Patent application 63/090,670, entitled "METHOD, APPARATUS, AND SYSTEM FOR WIRELESS MONITORING TO ENSURE SECURITY", filed on Oct. 12, 2020,
(u) U.S. Provisional Patent application 63/104,422, entitled "METHOD, APPARATUS, AND SYSTEM FOR WIRELESS MONITORING", filed on Oct. 22, 2020,
(v) U.S. Provisional Patent application 63/112,563, entitled "METHOD, APPARATUS, AND SYSTEM FOR WIRELESS MONITORING BASED ON ANTENNA ARRANGEMENT", filed on Nov. 11, 2020,
(w) U.S. patent application Ser. No. 17/113,024, entitled "METHOD, APPARATUS, AND SYSTEM FOR PROVIDING AUTOMATIC ASSISTANCE BASED ON WIRELESS MONITORING", filed on Dec. 5, 2020,
(x) U.S. patent application Ser. No. 17/113,023, entitled "METHOD, APPARATUS, AND SYSTEM FOR ACCURATE WIRELESS MONITORING", filed on Dec. 5, 2020,
(y) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
  (1) which is a Continuation-in-Part of U.S. patent application Ser. No. 16/667,648, entitled "METHOD, APPARATUS, AND SYSTEM FOR WIRELESS PROXIMITY AND PRESENCE MONITORING", filed on Oct. 29, 2019, issued as U.S. Pat. No. 11,035,940 on Jun. 15, 2021, a. which is a Continuation-in-Part of U.S. patent application Ser. No. 16/446,589, entitled "METHOD, APPARATUS, AND SYSTEM FOR OBJECT TRACKING AND SENSING USING BROADCASTING", filed on Jun. 19, 2019, issued as U.S. Pat. No. 10,742,475 on Aug. 11, 2020,
  1. which is a Continuation-in-Part of U.S. patent application Ser. No. 16/101,444, entitled "METHOD, APPARATUS, AND SYSTEM FOR WIRELESS MOTION MONITORING", filed on Aug. 11, 2018, issued as U.S. Pat. No. 10,291,460 on May 14, 2019,
(z) U.S. patent application Ser. No. 17/149,667, entitled "METHOD, APPARATUS, AND SYSTEM FOR WIRELESS MONITORING WITH FLEXIBLE POWER SUPPLY", filed on Jan. 14, 2021,
(aa) U.S. patent application Ser. No. 17/180,763, entitled "METHOD, APPARATUS, AND SYSTEM FOR WIRELESS WRITING TRACKING", filed on Feb. 20, 2021,
(bb) U.S. patent application Ser. No. 17/180,762, entitled "METHOD, APPARATUS, AND SYSTEM FOR FALL-DOWN DETECTION BASED ON A WIRELESS SIGNAL", filed on Feb. 20, 2021,
(cc) U.S. patent application Ser. No. 17/180,760, entitled "METHOD, APPARATUS, AND SYSTEM FOR WIRELESS MATERIAL SENSING", filed on Feb. 20, 2021,
(dd) U.S. patent application Ser. No. 17/180,766, entitled "METHOD, APPARATUS, AND SYSTEM FOR WIRELESS MOTION RECOGNITION", filed on Feb. 20, 2021, (ee) U.S. patent application Ser. No. 17/214,838, entitled "METHOD, APPARATUS, AND SYSTEM FOR WIRELESS VITAL MONITORING USING HIGH FREQUENCY SIGNALS", filed on Mar. 27, 2021,
(ff) U.S. patent application Ser. No. 17/214,841, entitled "METHOD, APPARATUS, AND SYSTEM FOR WIRELESS PROXIMITY SENSING", filed on Mar. 27, 2021,
(gg) U.S. patent application Ser. No. 17/214,836, entitled "METHOD, APPARATUS, AND SYSTEM FOR WIRELESSLY TRACKING KEYSTROKES", filed on Mar. 27, 2021,
(hh) U.S. Provisional Patent application 63/209,907, entitled "METHOD, APPARATUS, AND SYSTEM FOR WIRELESS MOTION AND SOUND SENSING", filed on Jun. 11, 2021.
(ii) U.S. patent application Ser. No. 17/352,185, entitled "METHOD, APPARATUS, AND SYSTEM FOR WIRELESS MICRO MOTION MONITORING", filed on Jun. 18, 2021.

TECHNICAL FIELD

The present teaching generally relates to wireless motion monitoring. More specifically, the present teaching relates to wirelessly monitoring motions for improving security by processing wireless channel information (CI).

BACKGROUND

Object motion detection becomes more and more important nowadays. For example, for security and/or management purposes, a user may want to detect any object motion in the user's house; a manager of a supermarket may want to detect any object motion in the supermarket; and a nurse in a hospital may want to detect any motion of a patient in the hospital.

Existing systems and methods for detecting object motions cannot provide enough accuracy and often lead to false alarms. Existing approaches include those based on passive infrared (PIR), active infrared (AIR) and Ultrasonic. PIR sensors are the most widely used motion sensor in home security systems, which detect human motions by sensing the difference between background heat and the heat emitted by moving people. However, solutions based on PIR sensors are prone to false alarms due to its sensitivity to environmental changes, like hot/cold air flow and sunlight. These solutions are easily defeated by blocking the body heat emission, e.g. wearing a heat-insulating full-body suit. In addition, the solutions have limited detection ranges and need line-of-sight (LOS), and thus multiple devices are needed. In AIR based approaches, an infrared (IR) emitter sends a beam of IR which will be received by an IR receiver. When the beam is interrupted, a motion is detected. However, this kind of approaches can be easily seen as using a regular camera or any IR detection mechanism and also has limited range and thus need LOS. Ultrasonic sensors detect human motion by sending out ultrasonic sound waves into a space and measuring the speed at which they return, and motion can be detected if there are frequency changes. However, this kind of approaches can be defeated by wearing an anechoic suit. In addition, ultrasound cannot penetrate solid objects such as furniture or boxes and thus cause gaps in detection field. Furthermore, slow movements by a burglar may not trigger an alarm in an ultrasound-based detection system.

Thus, existing systems and methods for detecting object motions are not entirely satisfactory.

SUMMARY

The present teaching generally relates to wireless motion monitoring. More specifically, the present teaching relates to wirelessly monitoring motion for improving security by processing wireless channel information (CI).

In one embodiment, a system for wireless motion monitoring is described. The system comprises: a transmitter configured for transmitting a first wireless signal through a wireless multipath channel of a venue; a receiver configured for receiving a second wireless signal through the wireless multipath channel; and a processor. The second wireless signal differs from the first wireless signal due to the wireless multipath channel and a motion of an object in the venue. The processor is configured for: obtaining a time series of channel information (TSCI) of the wireless multipath channel based on the second wireless signal; computing a spatial-temporal information (STI) based on the TSCI; monitoring the motion of the object based on the TSCI and the STI; performing a task based on the monitoring; and generating a response based on the task.

In another embodiment, a wireless device of a wireless monitoring system is described. The wireless device comprises: a processor; a memory communicatively coupled to the processor; and a receiver communicatively coupled to the processor. An additional wireless device of the wireless monitoring system is configured for transmitting a first wireless signal through a wireless multipath channel of a venue in accordance with a current operating mode. The receiver is configured for receiving a second wireless signal through the wireless multipath channel in accordance with the current operating mode. The second wireless signal differs from the first wireless signal due to the wireless multipath channel and a motion of an object in the venue. The processor is configured for: choosing the current operating mode from a plurality of supported operating modes associated with a task and the motion of the object; obtaining a time series of channel information (TSCI) of the wireless multipath channel based on the second wireless signal; computing a spatial-temporal information (STI) based on the TSCI; monitoring the motion of the object based on the TSCI and the STI; performing the task based on the monitoring; and generating a response based on the task.

In yet another embodiment, a method of a wireless monitoring system is described. The method comprises: transmitting a plurality of wireless signals asynchronously through a wireless multipath channel of a venue, wherein each wireless signal is transmitted from a respective one of a plurality of first devices in the wireless monitoring system; receiving the plurality of wireless signals by a plurality of second devices in the wireless monitoring system through the wireless multipath channel, wherein each received wireless signal differs from the respective transmitted wireless signal due to the wireless multipath channel and a motion of an object in the venue; obtaining each of a plurality of time series of channel information (TSCI) of the wireless multipath channel based on a respective received wireless signal; computing a plurality of spatial-temporal information (STI) each based on a respective TSCI; monitoring a first aspect of the motion of the object based on a first subset of the plurality of TSCI and a first subset the plurality of STI; monitoring a second aspect of the motion of the object based on a second subset of the plurality of TSCI and a second subset the plurality of STI; performing a first task based on monitoring the first aspect of the motion; performing a second task based on monitoring the second aspect of the motion; generating a first response based on the first task; and generating a second response based on the second task.

Other concepts relate to software for implementing the present teaching on wireless motion monitoring. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
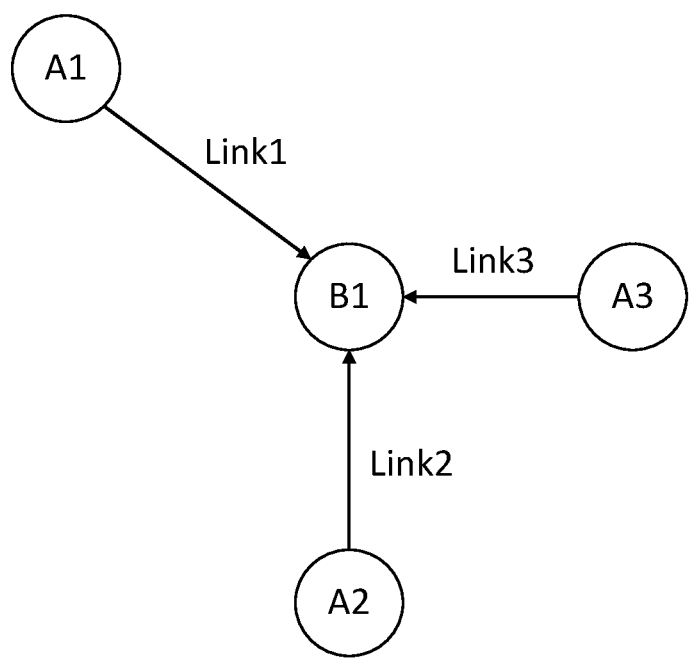
FIG. 1 shows an exemplary network topology of four devices, according to some embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a retraining, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated. There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object. The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals. For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address. A location of a Type 2 device in the venue may be computed based on the particular MAC address, the series of probe signals, and/or the at least one TSCI obtained by the Type 2 device from the probe signals. The computing may be performed by the Type 2 device. The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel. The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular IAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different. The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same. The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time. The first and/or second series of probe signals may be transmitted to a first MAC address and/or second IAC address respectively. The two IAC addresses may be same/different. The first series of probe signals may be transmitted in a first channel. The second series of probe signals may be transmitted in a second channel. The two channels may be same/different. The first or second IAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device. Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device. The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver). Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source. If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration. The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually. The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc. The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE. The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.). For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event. At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device. A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1-D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. F(X, Y, . . . )) with at least two arguments: X and Y. The two arguments may be scalars. The function (e.g. F) may be a function of at least one of: X, Y, (X−Y), (Y−X), abs(X−Y), X^a, Y^B, abs(X^a−Y^B), (X−Y)^a, (X/Y), (X+a)/(Y+b), (X^a/Y^B), and ((X/Y)^a−b), wherein a and b are may be some predetermined quantities. For example, the function may simply be abs(X−Y), or (X−Y)^2, (X−Y)^4. The function may be a robust function. For example, the function may be (X−Y)^2 when abs (X−Y) is less than a threshold T, and (X−Y)+a when abs(X−Y) is larger than T. Alternatively, the function may be a constant when abs(X-Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X=(x_1, x_2, . . . , x_n) and Y=(y_1, y_2, . . . , y_n). The function may be a function of at least one of: x_i, y_i, (x_i−y_i), (y_i−x_i), abs(x_i−y_i), x_i^a, y_i^b, abs(x_i^a−y_i^b), (x_i−y_i)^a, (x_i/y_i), (x_i+a)/(y_i+b), (x_i^a/y_i^b), and ((x_i/y_i)^a−b), wherein i is a component index of the n-tuple X and Y, and 1<=i<=n.g. component index of x_1 is i=1, component index of x_2 is i=2. The function may comprise a component-by-component summation of another function of at least one of the following: x_i, y_i, (x_i−y_i), (y_i−x_i), abs(x_i−y_i), x_i^a, y_i^B, abs(x_i^a−y_i^B), (x_i−y_i)^a, (x_i/y_i), (x_i+a)/(y_i+b), (x_i^a/y_i^b), and ((x_i/y_i)^a−b), wherein i is the component index of the n-tuple X and Y. For example, the function may be in a form of sum_{i=1}^n (abs(x_i/y_i)−1)/n, or sum_{i=1}^n w_i*(abs(x_i/y_i)−1), where w_i is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the i^{th} domain item is mapped to the j^{th} range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCJ. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated. The first section of the first time duration of the first TSCI may be a sliding section of the first TSCJ. The second section of the second time duration of the second TSCI may be a sliding section of the second TSCJ. A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%). In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier. The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

Channel/Channel Information/Venue/Spatial-Temporal Info/Motion/Object

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information (including feedback or steering matrices generated by wireless communication devices, according to a standardized process, e.g., IEEE 802.11, or another standard), transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, L_1 norm, L_2 norm, L_k norm for k>2, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object. The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed).

The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car). The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/ control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/ control coffee machine/hot water pot, turn on/off/control/ preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/ messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/ speech synthesis/sound/voice/music/song/sound field/background sound field/dialog system, using visual tool such as TV/entertainment system/computer/notebook/smart pad/ display/light/color/brightness/patterns/symbols, using haptic tool/virtual reality tool/gesture/tool, using a smart device/ appliance/material/furniture/fixture, using web tool/server/ hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/ heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with manmade object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, subsurface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802,11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc. Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects. The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time. For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function. The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost. The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.). The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc. The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawlspace, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Washington. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away. Sometime later, Stephen is convinced that the disclosed wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface (UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11 a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g.

hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

Type 1 device (transmitter, or Tx) and Type 2 device (receiver, or Rx) may be on same device (e.g. RF chip/IC) or simply the same device. The devices may operate at high frequency band, such as 28 GHz, 60 GHz, 77 GHz, etc. The RF chip may have dedicated Tx antennas (e.g. 32 antennas) and dedicated Rx antennas (e.g. another 32 antennas).

One Tx antenna may transmit a wireless signal (e.g. a series of probe signal, perhaps at 100 Hz). Alternatively, all Tx antennas may be used to transmit the wireless signal with beamforming (in Tx), such that the wireless signal is focused in certain direction (e.g. for energy efficiency or boosting the signal to noise ratio in that direction, or low power operation when "scanning" that direction, or low power operation if object is known to be in that direction).

The wireless signal hits an object (e.g. a living human lying on a bed 4 feet away from the Tx/Rx antennas, with breathing and heart beat) in a venue (e.g. a room). The object motion (e.g. lung movement according to breathing rate, or blood-vessel movement according to heart beat) may impact/modulate the wireless signal. All Rx antennas may be used to receive the wireless signal.

Beamforming (in Rx and/or Tx) may be applied (digitally) to "scan" different directions. Many directions can be scanned or monitored simultaneously. With beamforming, "sectors" (e.g. directions, orientations, bearings, zones, regions, segments) may be defined related to the Type 2 device (e.g. relative to center location of antenna array). For each probe signal (e.g. a pulse, an ACK, a control packet, etc.), a channel information or CI (e.g. channel impulse response/CIR, CSI, CFR) is obtained/computed for each sector (e.g. from the RF chip). In breathing detection, one may collect CIR in a sliding window (e.g. 30 sec, and with 100 Hz sounding/probing rate, one may have 3000 CIR over 30 sec).

The CIR may have many taps (e.g. N1 components/taps). Each tap may be associated with a time lag, or a time-of-flight (tof, e.g. time to hit the human 4 feet away and back). When a person is breathing in a certain direction at a certain distance (e.g. 4 ft), one may search for the CIR in the "certain direction". Then one may search for the tap corresponding to the "certain distance". Then one may compute the breathing rate and heart rate from that tap of that CIR.

One may consider each tap in the sliding window (e.g. 30 second window of "component time series") as a time function (e.g. a "tap function", the "component time series"). One may examine each tap function in search of a strong periodic behavior (e.g. corresponds to breathing, perhaps in the range of 10 bpm to 40 bpm).

The Type 1 device and/or the Type 2 device may have external connections/links and/or internal connections/links. The external connections (e.g. connection 1110) may be associated with 2G/2.5G/3G/3.5G/4G/LTE/5G/6G/7G/ NBIoT, UWB, WiMax, Zigbee, 802.16 etc. The internal connections (e.g., 1114A and 1114B, 1116, 1118, 1120) may be associated with WiFi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/ standard.

The Type 1 device and/or Type 2 device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiMH battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, invertor, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bulldozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc.), the Type 1 device and/or Type 2 device may be an embedded device embedded in the vehicle, or an add-on device (e.g. aftermarket device) plugged into a port in the vehicle (e.g. OBD port/socket, USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle). The two devices may jointly monitor the passengers including children/babies in the car. They may be used to count the passengers, recognize the driver, detect presence of passenger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, parking ticket, golf cart, bicycle, smart phone, tablet, camera, recording device, smart watch, roller skate, shoes, jackets, goggle, hat, eye-wear, wearable, Segway, scooter, luggage tag, cleaning machine, vacuum cleaner, pet tag/collar/wearable/implant), each device either plugged into 12V accessory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-storey parking facility, scattered locations to cover a big area such as factory/stadium/train station/shopping mall/construction site. The Type A device may be located, tracked or monitored based on the TSCI.

The area/venue may have no local connectivity, e.g., broadband services, WiFi, etc. The Type 1 and/or Type 2 device may be portable. The Type 1 and/or Type 2 device may support plug and play.

Any device (e.g., Origin 1104, Bot 1 1102A, Bot 2 1102B) may provide location information, through GPS, MAC layer, PHY layer, Wi-Fi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/, standard, 802.16, Zigbee, WiMax, UWB, mobile channel, 1G/2G/3G/3.5G/4G/LTE/5G/6G/7G/NBIoT, etc.

Pairwise wireless links may be established between many pairs of devices, forming the tree structure. In each pair (and the associated link), a device (second device) may be a non-leaf (Type B). The other device (first device) may be a leaf (Type A or Type B) or non-leaf (Type B). In the link, the first device functions as a bot (Type 1 device or a Tx device) to send a wireless signal (e.g. probe signal) through the wireless multipath channel to the second device. The second device may function as an Origin (Type 2 device or Rx device) to receive the wireless signal, obtain the TSCI and compute a "linkwise analytics" based on the TSCI.

The symbol "/" disclosed herein means "and/or". For example, "A/B" means "A and/or B." The present teaching is about a method, apparatus, device, system and/or software of a wireless monitoring system. In one embodiment, the system comprises a number of wireless devices placed in respective positions of a venue working together to monitor a motion of an object in the venue based on wireless signals.

Among the wireless devices, there are at least two types of devices: Type1 and Type2. Devices of the same type may be heterogeneous, with possibly different hardware configuration (including but not limited to processor, memory, circuits, layout, board, module, assembly, housing, manufacturing, clock rate, radio, antennas, bus, connectors, etc), or software/firmware, or manufacturer/brand, etc). Some device may be both Type1 and Type2 (e.g. alternately or simultaneously or contemporaneously or asynchronously). In the network, a Type1 heterogeneous wireless devices is configured to transmit a wireless signal in a wireless multipath channel of the venue to a Type2 heterogeneous wireless device. The Type2 device is configured to receive the wireless signal and obtain a time series of channel information (CI) of the wireless multipath channel. The time series of CI (TSCI) may be extracted from the wireless signal. A characteristics (e.g. at least one series of characteristics) and/or a spatial-temporal information (STI, e.g. motion information or at least one series of STI) of either the object and/or of the motion of the object may be computed based on the TSCI. A task may be performed in cooperation with a server (e.g. cloud server, local server) based on an analysis and/or processing (e.g. storage, transmission, machine learning, artificial intelligence (AI), preprocessing, postprocessing) of the characteristics and/or STI. A presentation (e.g. text, visual, audio, audio-visual, animation) associated with the task may be generated on a user-interface (UI) of a user-device of a user of the system.

The system may have at least one operating mode. Each wireless device may have a corresponding operating mode. There may be one or more "Away" mode or an "Armed" mode in which no one is expected to be in the venue. The modes may be called "Away" mode or "Armed" mode, or "Guard" mode. The task may be a security task to monitor if there are any "intruder(s)" who may be an authorized/legitimate user or an actual intruder, and/or to detect any suspicious activities in the venue. If "intruder"/suspicious activity is detected, some response may be triggered, such as entering an "Identification Friend-or-Foe" (IFF) mode/"Interrogation" mode/"Alarm" mode (e.g. finite state machine or FSM), detecting/monitoring pet in venue, sounding a siren, controlling some connected device (e.g. in the venue), opening the door/window/garage door/gate (e.g. to attract attention of neighbors), locking the door/window/garage door/gate (to trap intruder), conducting a dialog with "intruder", capture video/image/sound of "intruder", giving warning message(s) to "intruder", turning on/off illumination/lighting, activating/coordinating with another alarm system, sending warning message(s) to user(s)/designated contact(s) using some communication system to the user device, notifying the user/guardian/designated contacts/police/first responder.

In particular, in a first mode (e.g. "Away" mode) with an assumption that the user is not present in the venue such that no object motion is expected, the task of the system may be to monitor any presence of "intruder" or suspicious activity (e.g. object motion) in the venue (e.g. door open, window open, intruder movement) based on the TSCI, the characteristics, the STI and/or the analysis. The system may filter out or ignore influence/effects of "forgettable" or "forgivable" or "non-target" activities (e.g. forgettable postman delivering mail outside a house, or non-target slight motion in the house due to air movement, wind, air-conditioning system or even fan movement). When "intruder" or suspicious activity is detected, the response may comprise entering a second mode (e.g. "IFF" mode).

In the second mode, "intruder" or suspicious activity may be assumed to have been detected and the system may conduct a dialog with the "intruder" using a smart speaker with microphone and challenge the "intruder" for a password or a pass code. If the "intruder" can give the password or pass code correctly within a time limit, the system may conclude that it is the user (or one of the authorized users), and may enter a third mode (e.g. "in-venue" mode) without any siren sounding or notification. If the "intruder" cannot give the password or pass code correctly within the time limit, the system may conclude that the "intruder" is a genuine intruder and may sound the siren and notify the user/guardian/designated contacts. If a primary contact does not respond within a certain time, a secondary contact may be contacted, and so on.

In the third mode (e.g. "in-venue" mode or "Home" mode), the user (or other authorized users) may be assumed to be in the venue and the task of the system may be to monitor the user's daily activity, motion, presence, location, movement, gait, gesture, toilet visits timing/frequency, hygiene timing/frequency, breathing, heart-beat, well-being, sleep, health, irregularity, signs of problem, dangerous motion, fall down, etc., based on the TSCI, the characteristics, the STI and/or the analysis. The response in the third mode may NOT have any siren sounding. Depending on what is being monitored, the response may or may not comprise any notification of user/designated contacts.

In the fourth mode, the system may sound the siren and notify the user/guardian/designated contacts. If a primary contact does not respond within a certain time, a secondary contact may be contacted, and so on.

In another mode (e.g. "Guard" mode) different from the first mode, the system may perform the same monitoring as the first mode but with a different response. For example, if "intruder" or suspicious activity is detected in the first mode, the response may comprise entering the fourth mode directly without going through the second mode.

In particular, the response for one mode (e.g. "Away" mode) may comprise both sounding the siren and notifying the user or designated contact or both. The response for another mode (e.g. "Guard" mode) may comprise notifying the user/designated contact but not sounding the siren.

Conducting dialog with "intruder" may comprise at least one of: request password/pass code/identification/verification, interrogate/question/probe/challenge, using real-time generated discourse/dialog, synthesized speech, utterance/speech recognition, text, and/or pre-recorded/pre-planned media content, etc. Giving warning message(s) to "intruder" may comprise at least one of: using text on some display/screen, verbal warning using some speaker, and/or animation using some connected devices with UI, etc.

The connected device may comprise at least one of: motion sensor, cameras, displays, microphones, speakers, siren, instruments, lighting, illumination, light, lamp, TV, consumer electronics, IoT devices, smart devices, smart appliance, refrigerator, cooking devices, stove, smoke detector, bell, access control, alarm clock, moveable components, fan, air conditioner, door, window, blind, curtain, garage door, gate, and/or lawn watering system, etc. Designated contact(s) may comprise at least one of: primary contact, secondary contact, and/or backup contact. The communication system may comprise at least one of: network, internet, telephone, internet service provider, mobile service provider, broadcaster, cable provider, content streaming provider, conferencing system, SMS, EMS, MMS, email, instant messaging system, enterprise messaging system, personal messaging system, Facebook Messenger, Face Time, Line, etc.

There may be an "in-venue" or "Home" mode in which the user and/or other people (e.g. house mate, colleague, office mate, roommate, family, partner, friends, pets) are present in the venue. The task may be to monitor their activities.

The system may have a siren button or a panic button so that the user can trigger the siren in his home by holding down the button for a certain time, e.g. 5 seconds. An emergency message may be sent out after the operation of the siren button. The siren will go off for a default time (e.g. 3 minutes) unless the user clicks the Cancel button in the dashboard. Pressing the button enables emergency dispatch to the user's home address to protect the home and property. The siren button can be implemented through a dedicated hardware, e.g. a physical button located on the device so that the user can trigger the siren by pressing the button. It can also be implemented through an app with user interface (UI) on a mobile device so that the user can trigger the siren by clicking the button icon on the UI. There may be other activation methods on the UI, e.g., press and hold on the UI object, swipe the button, or another customized pattern. The system may enable the reception of the emergency message via a network, local area network, broadband network, internet, cloud network, wireless local area network, WiFi, Bluetooth, BLE, Zigbee, Z-Wave, text messaging system, instant messaging system, conferencing system, notification system, announcement system, bulletin board, email, SMS, MMS, Apple Facetime, Facebook Messenger, Google Hangout, Line, Instagram, Zoom, Google Hangout, WebEx, etc.

In some embodiments, the system may be switched from one mode to another mode, based on user input, motion detection, no-motion detection, and/or another condition. In one embodiment, the system is in a Home mode, and there is no motion detected in the venue for 10 minutes. Then, the system checks the existence for each of the registered and selected items (e.g. key fobs). If none of the registered and selected items is in presence and the system is still in Home mode, the system may perform at least one of the following based on a pre-setting by the user: sending a notification to the user including e.g. a message of "Looks like no one is at home, arm the house?", automatically transitioning the system into an Away mode, and/or doing nothing. For example, based on a user setting, if there is no motion detected in the venue for 10 minutes from 08:30 am to 05:00 pm during weekdays, the system may either sending a notification to the user for the user to confirm mode transition to Away mode, or directly transitioning the system into the Away mode without checking with the user.

In another embodiment, the system is in the Away mode already, and the system senses the change from a first state where none of the registered and selected items is in presence in the venue to a second state where any one of the registered and selected items becomes in proximity to or into the venue. Then the system may perform at least one of the following based on a pre-setting by the user: sending a notification to the user including e.g. a message of "Welcome home, disable the Away mode?", automatically transitioning the system into the Home mode, and/or doing nothing.

In another embodiment, when the system detects that one of the registered and selected items (e.g. key fob K) leaves or enters the venue (e.g. a home building), the system may present a notification to one or more designated users, e.g. presenting a message like "key fob K left home @ xx:xx," or "key fob K arrived back home @ yy:yy.

In one embodiment, the system may employ an architecture of a star topology as shown in FIG. 1. Multiple transmitters A1, A2, and A3 may transmit probe signals to a single receiver B1 which computes linkwise analytics.

Figure 2:
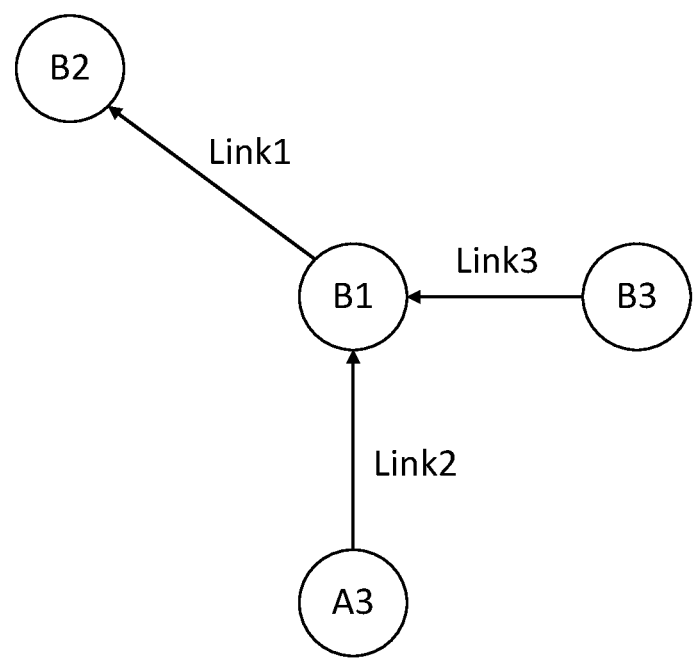
FIG. 2 shows an exemplary network topology of four devices, according to some embodiments of the present teaching.

In one embodiment, the system may employ an architecture of a "daisy chain" as shown in FIG. 2. When a pairwise link Link1 comprises of two Type B devices (i.e. when both the first device and the second device are Type B devices), something special happened, as shown in FIG. 2. Let B1 be the first device (Tx, transmit probe signal) and B2 be the second device (Rx, obtain TSCI, compute linkwise analytics) in the current link. In addition to the current link, B1 may be in addition links (e.g. a Link2 connecting B1 to a Type A device called A3, a Link3 connecting B1 to another Type B device called B3). In Link2, A3 is Tx and transmits a probe signal, while B1 is Rx and computes linkwise analytics. This linkwise analytics will be transmitted from B1 to B2 in Link1. In Link3, B3 is Tx and transmits a probe signal, while B1 is Rx and computes linkwise analytics. This linkwise analytics will be transmitted from B1 to B2 in Link1. Furthermore, B3 may have obtained some linkwise analytics and may transmit/pass along to B1 in Link3. These linkwise analytics may be sent from B1 to B2 in Link1.

Figure 3:
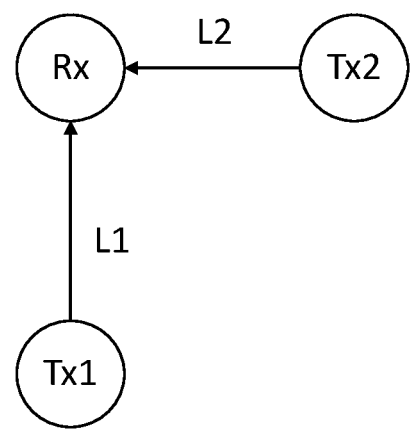
FIG. 3 shows an exemplary network topology of three devices, according to some embodiments of the present teaching.

Another exemplary system having a mesh network topology is shown in FIG. 3. Two Type 1 devices (transmitter, or Tx, or Bot) are linked to one Type 2 device (receiver, or Rx, or Origin) via some radio interface links L1 and L2. The routing format may be like "TxID:ifname:hwaddr", where "TxId" is the identifier (that may be unique) of the device, "ifname" is the interface name, and "hwaddr" is the MAC address used for communication. Then, the routing table for the topology shown in FIG. 3 may be routing={Tx1:L1: Tx1_mac, Tx2:L2: Tx2_mac}.

Figure 4:
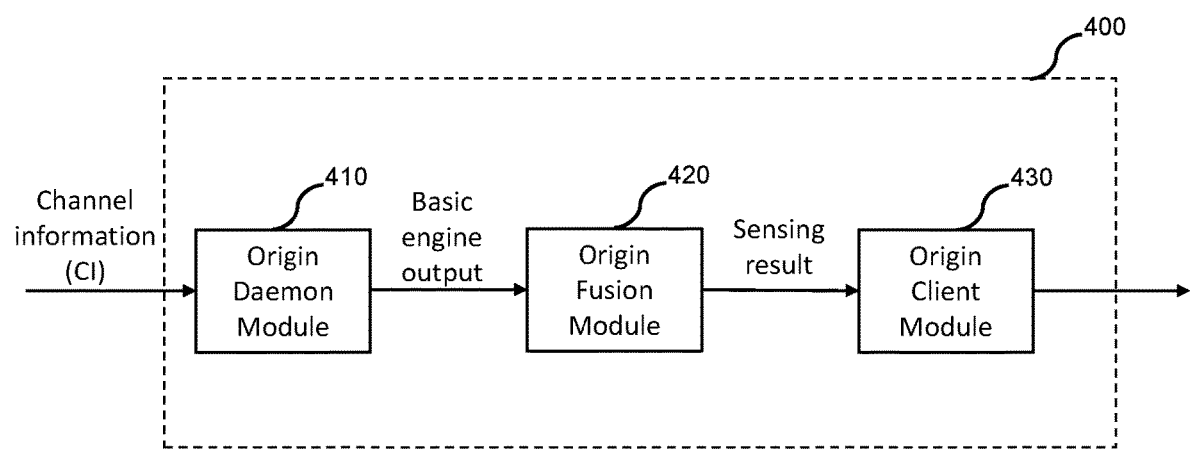
FIG. 4 shows exemplary flow chart and components of a Master Origin device, according to some embodiments of the present teaching.

Additional functionalities may be associated with the Rx in order to pass the sensing outputs to the cloud. In this case, the Rx may be a "Master Origin" 400 as shown in FIG. 4. For example, as in FIG. 4, the Master Origin (MO) 400 may be composed of a daemon module 410, a fusion module 420, and a client module 430. The daemon module 410 may receive channel state information (CSI)/channel information (CI) sent from other devices, e.g., Bots, for sensing. The MOs may comprise basic engines that support different applications, such as motion engine, breathing engine, etc., which may output motion statistics, breathing rates, etc. These outputs may also be called "radio analytics", because they are analytics calculated based on the CSI extracted from radio signals. These outputs are then fed into the fusion module 420 for the different applications, such as home security, sleep monitoring, wellbeing monitoring, child presence detection, etc. Final results may be determined in the fusion module 420, and fed into the client module 430 to be sent to the cloud via Ethernet connection through a hub. Another cloud fusion module may be run in the cloud.

FIG. 3 shows an example of only one daemon module existing in the mesh network. In certain cases, more than one daemon module may be required to boost calculation capability. The reason for multiple origin daemons is to perform basic engine sensing on the links that do not have direct link to the master origin (MO). One needs to have Origin daemon module to receive the channel state information (CSI) from the local wireless LAN (WLAN) driver and calculate the basic engine output that consumes CSI. One may do the fusion of the basic engine results in the Origin fusion module in a MO.

Figure 5:
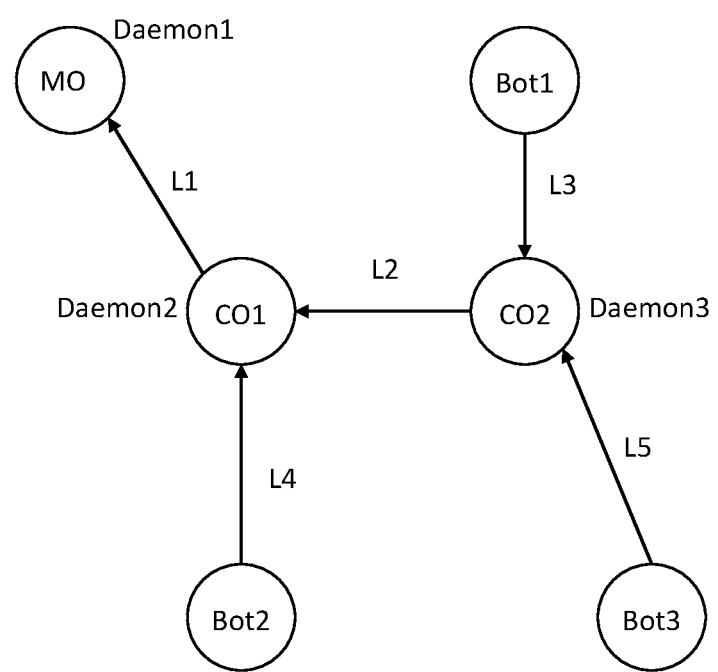
FIG. 5 shows an exemplary network topology of six devices, according to some embodiments of the present teaching.

Another example with more than one daemon module is shown in FIG. 5. There is one Master Origin (MO), two Child Origins (CO), and three Bots. Different from the MO, the CO may not have the fusion and client modules, and may include only the daemon module. The MO connects every local device to cloud through a client module. Here, L1, L2, L3, L4, L5 are radio interface links connecting two devices. In some embodiments, the routing format may be like "TxID:origindaemon_IP:ifname:hwaddr", where "TxId" is the identifier (that is unique) of the transmitting device, "origindaemon_IP" is the local area network (LAN) IP address of the receiving node running the local origin daemon, "ifname" is the interface name of the radio link to the TxID device, and "hwaddr" is the MAC address used to identify the device in the wireless LAN (WLAN) driver. The routing table for this topology becomes {CO1:MO_IP:L1: CO1_mac, CO2:CO1_IP:L2:CO2_mac, B1:CO2_IP:L3: B1_mac, B2:CO1_IP:L4:B2_mac, B3:CO2_IP:L5: B3_mac}. The IP addresses may be used to open UDP socket connections between the MO and all daemon modules on the local LAN.

Figure 6:
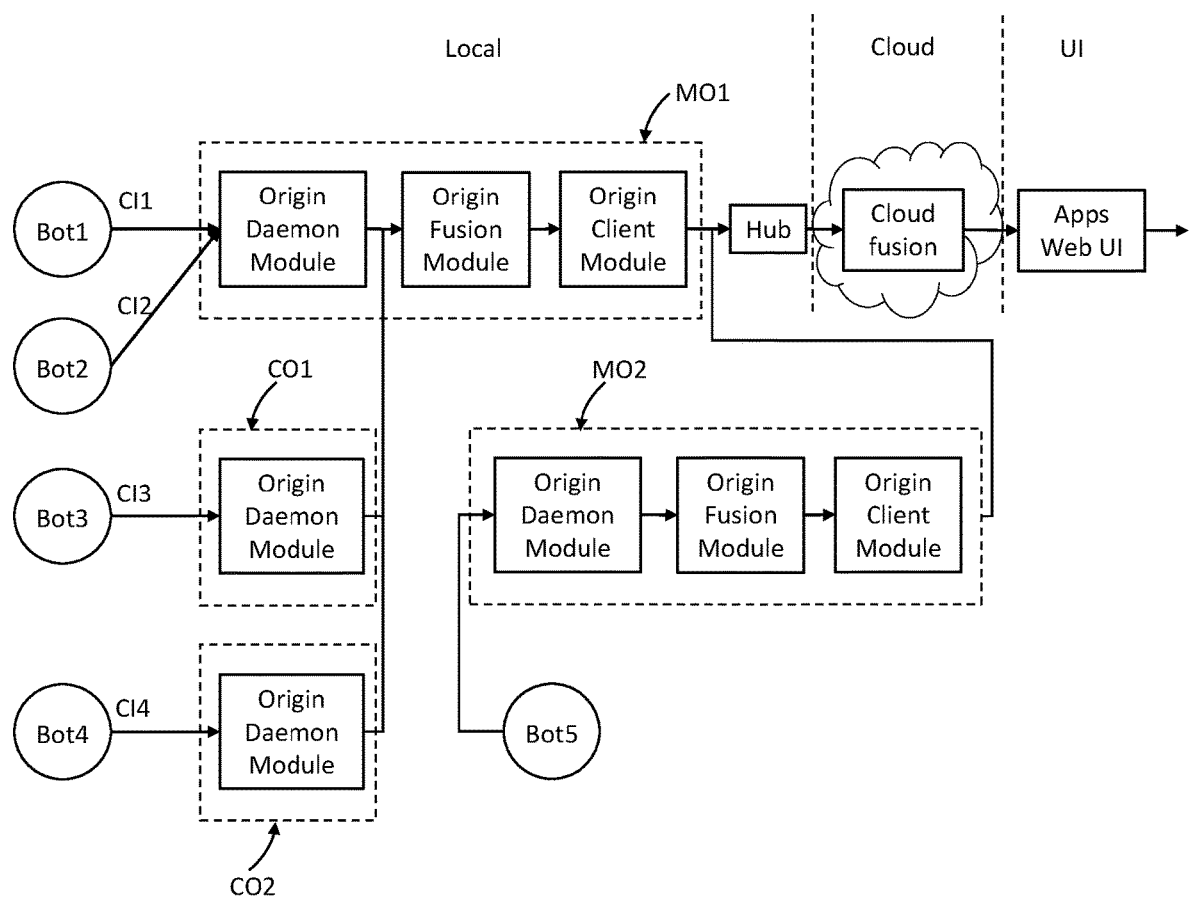
FIG. 6 shows an exemplary network topology of nine devices in the local area network, according to some embodiments of the present teaching.

Another exemplary network topology is shown in FIG. 6, where there are two MOs {MO1, MO2}, two COs {CO1, CO2}, and five Bots B1-B5. Both MO1 and MO2 may send final results from the local devices to the cloud through a Hub. The output from the cloud may be sent to some user interface (UI) in user apps or web UI.

Figure 7:
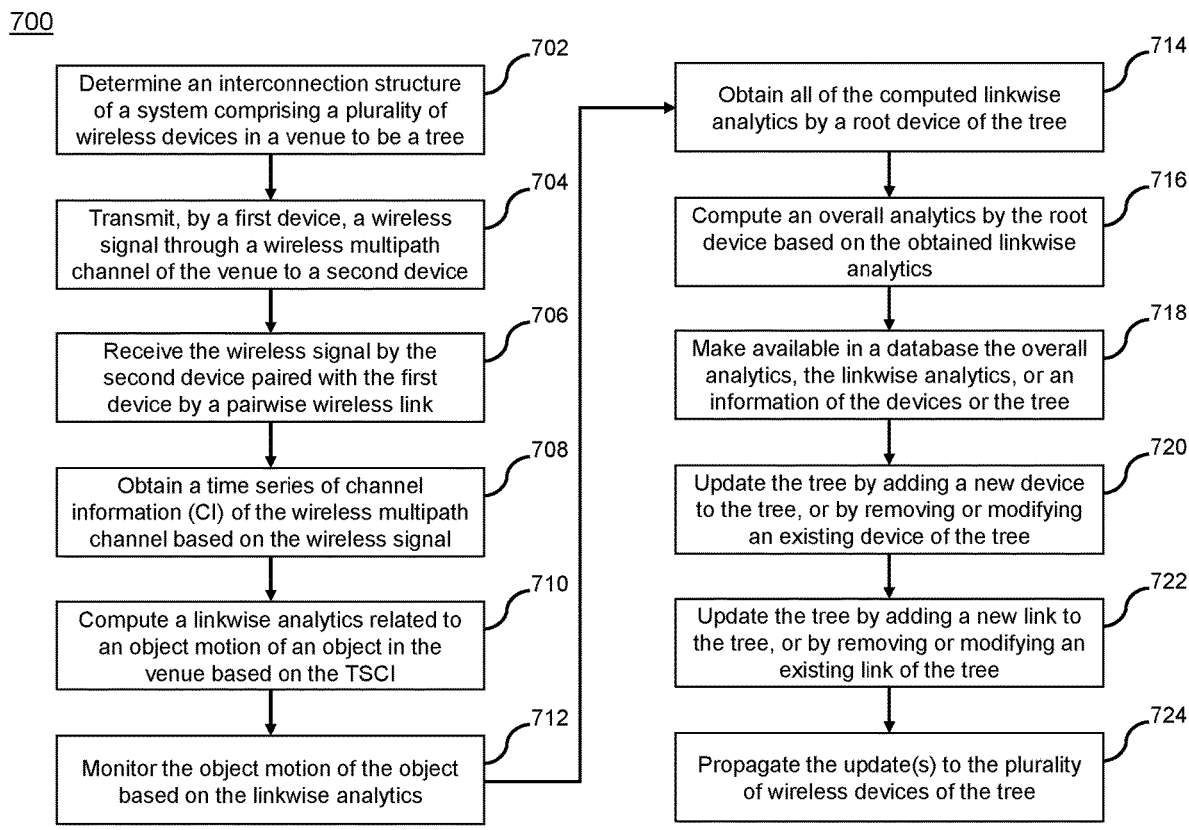
FIG. 7 illustrates a flow chart of an exemplary method for analyzing and improving network topology, according to some embodiments of the present teaching.

FIG. 7 illustrates a flow chart of an exemplary method 700 for analyzing and improving network topology, according to some embodiments of the present teaching. At operation 702, an interconnection structure of a wireless sensing system comprising a plurality of wireless devices in a venue is determined to be a tree. At operation 704, a wireless signal is transmitted by a first device through a wireless multipath channel of the venue to a second device. At operation 706, the wireless signal is received by the second device paired with the first device by a pairwise wireless link. At operation 708, a time series of channel information (CI) of the wireless multipath channel is obtained based on the wireless signal. At operation 710, a linkwise analytics related to an object motion of an object in the venue is computed based on the TSCI. At operation 712, the object motion of the object is monitored based on the linkwise analytics.

At operation 714, all of the computed linkwise analytics are obtained by a root device of the tree. At operation 716, an overall analytics is computed by the root device based on the obtained linkwise analytics. At operation 718, the overall analytics, the linkwise analytics, or an information of the devices or the tree is made available in a database. Optionally at operation 720, the tree is updated by adding a new device to the tree, or by removing or modifying an existing device of the tree. Optionally at operation 722, the tree is updated by adding a new link to the tree, or by removing or modifying an existing link of the tree. At operation 724, the update(s) are propagated to the plurality of wireless devices of the tree. The order of the operations in FIG. 7 may be changed in various embodiments of the present teaching.

The hardware devices may be added/enabled in the architecture. The hardware devices may be removed/disabled from the architecture. In particular, the topology/architecture is modified based on at least one of: modifying the at least one pairwise wireless link without adding any new wireless device or removing any existing wireless device, rearranging the at least one pairwise wireless link among a set of the plurality of wireless devices while keeping compositions of the set unchanged, adding a new wireless device, wherein the new wireless device is at least one of: a Type A device, a Type B device, a leaf node, a non-leaf node, or a root node, removing an existing wireless device, wherein the existing wireless device is at least one of: a Type A device, a Type B device, a leaf node, a non-leaf node, or a root node, replacing the root device with another device of the plurality of wireless devices, changing the at least one pairwise wireless link, adding a new pairwise wireless link, removing an existing pairwise wireless link, removing an existing pairwise wireless link of the tree without removing any wireless device of the tree, removing an existing pairwise wireless link of the tree by removing a wireless device of the tree, adding a new pairwise wireless link of the tree without adding any new wireless device to the tree, or adding a new pairwise wireless link of the tree by adding a new wireless device to the tree; and updating the information of the plurality of wireless devices and the tree in the database.

The management of the system architecture may be done at various levels, e.g., individual device level, group level, and overall system level. At the device level, each individual device can control its operation and make decisions. At group level management, multiple devices, e.g., in close vicinity or on the same floor, can form a group, and coordinate their decisions. At system level, all the devices in the system coordinate their decisions.

Figure 8:
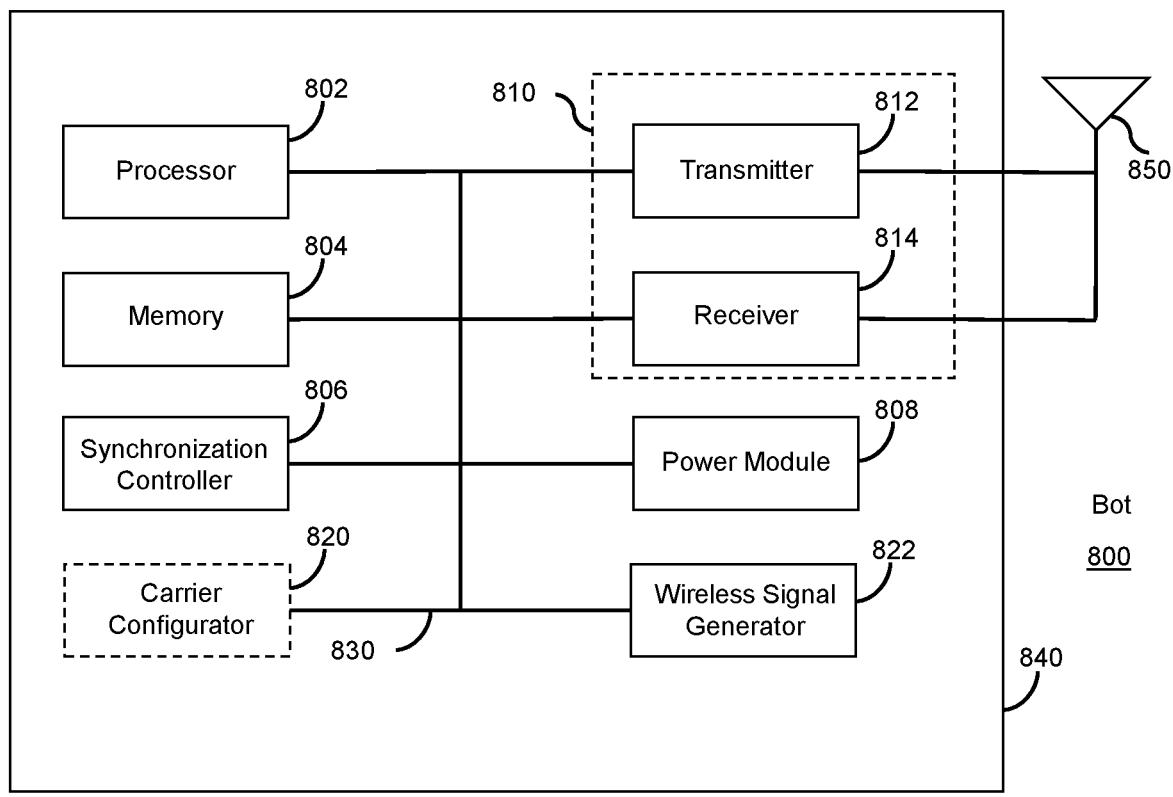
FIG. 8 illustrates an exemplary block diagram of a first wireless device of a wireless motion monitoring system, according to some embodiments of the present disclosure.

FIG. 8 illustrates an exemplary block diagram of a first wireless device, e.g. a Bot 800, of a wireless motion monitoring system, according to one embodiment of the present teaching. The Bot 800 is an example of a device that can be configured to implement the various methods described herein. As shown in FIG. 8, the Bot 800 includes a housing 840 containing a processor 802, a memory 804, a transceiver 810 comprising a transmitter 812 and receiver 814, a synchronization controller 806, a power module 808, an optional carrier configurator 820 and a wireless signal generator 822.

In this embodiment, the processor 802 controls the general operation of the Bot 800 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 804, which can include both read-only memory (ROM) and random access memory (RAM), can provide instructions and data to the processor 802. A portion of the memory 804 can also include non-volatile random access memory (NVRAM). The processor 802 typically performs logical and arithmetic operations based on program instructions stored within the memory 804. The instructions (a.k.a., software) stored in the memory 804 can be executed by the processor 802 to perform the methods described herein. The processor 802 and the memory 804 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 810, which includes the transmitter 812 and receiver 814, allows the Bot 800 to transmit and receive data to and from a remote device (e.g., an Origin or another Bot). An antenna 850 is typically attached to the housing 840 and electrically coupled to the transceiver 810. In various embodiments, the Bot 800 includes (not shown) multiple transmitters, multiple receivers, and multiple transceivers. In one embodiment, the antenna 850 is replaced with a multi-antenna array 850 that can form a plurality of beams each of which points in a distinct direction. The transmitter 812 can be configured to wirelessly transmit signals having different types or functions, such signals being generated by the processor 802. Similarly, the receiver 814 is configured to receive wireless signals having different types or functions, and the processor 802 is configured to process signals of a plurality of different types.

The Bot 800 in this example may serve as a transmitter, or Tx, or Bot in any one of FIGS. 1-6 for monitoring motions in a venue. For example, the wireless signal generator 822 may generate and transmit, via the transmitter 812, a wireless signal through a wireless channel in the venue. The wireless signal carries information of the channel, which is impacted by object motion in the venue. The generation of the wireless signal at the wireless signal generator 822 may be based on a request for wireless motion monitoring from another device, e.g. an Origin, or based on a system pre-configuration. That is, the Bot 800 may or may not know that the wireless signal transmitted will be used for wireless motion monitoring.

The synchronization controller 806 in this example may be configured to control the operations of the Bot 800 to be synchronized or un-synchronized with another device, e.g. an Origin or another Bot. In one embodiment, the synchronization controller 806 may control the Bot 800 to be synchronized with an Origin that receives the wireless signal transmitted by the Bot 800. In another embodiment, the synchronization controller 806 may control the Bot 800 to transmit the wireless signal asynchronously with other Bots. In another embodiment, each of the Bot 800 and other Bots may transmit the wireless signals individually and asynchronously.

The carrier configurator 820 is an optional component in Bot 800 to configure transmission resources, e.g. time and carrier, for transmitting the wireless signal generated by the wireless signal generator 822. In one embodiment, each CI of the time series of CI has one or more components each corresponding to a carrier or sub-carrier of the transmission of the wireless signal. The wireless motion monitoring may be based on any one or any combination of the components.

The power module 808 can include a power source such as one or more batteries, and a power regulator, to provide regulated power to each of the above-described modules in FIG. 8. In some embodiments, if the Bot 800 is coupled to a dedicated external power source (e.g., a wall electrical outlet), the power module 808 can include a transformer and a power regulator.

The various modules discussed above are coupled together by a bus system 830. The bus system 830 can include a data bus and, for example, a power bus, a control signal bus, and/or a status signal bus in addition to the data bus. It is understood that the modules of the Bot 800 can be operatively coupled to one another using any suitable techniques and mediums.

Although a number of separate modules or components are illustrated in FIG. 8, persons of ordinary skill in the art will understand that one or more of the modules can be combined or commonly implemented. For example, the processor 802 can implement not only the functionality described above with respect to the processor 802, but also implement the functionality described above with respect to the wireless signal generator 822. Conversely, each of the modules illustrated in FIG. 8 can be implemented using a plurality of separate components or elements.

Figure 9:
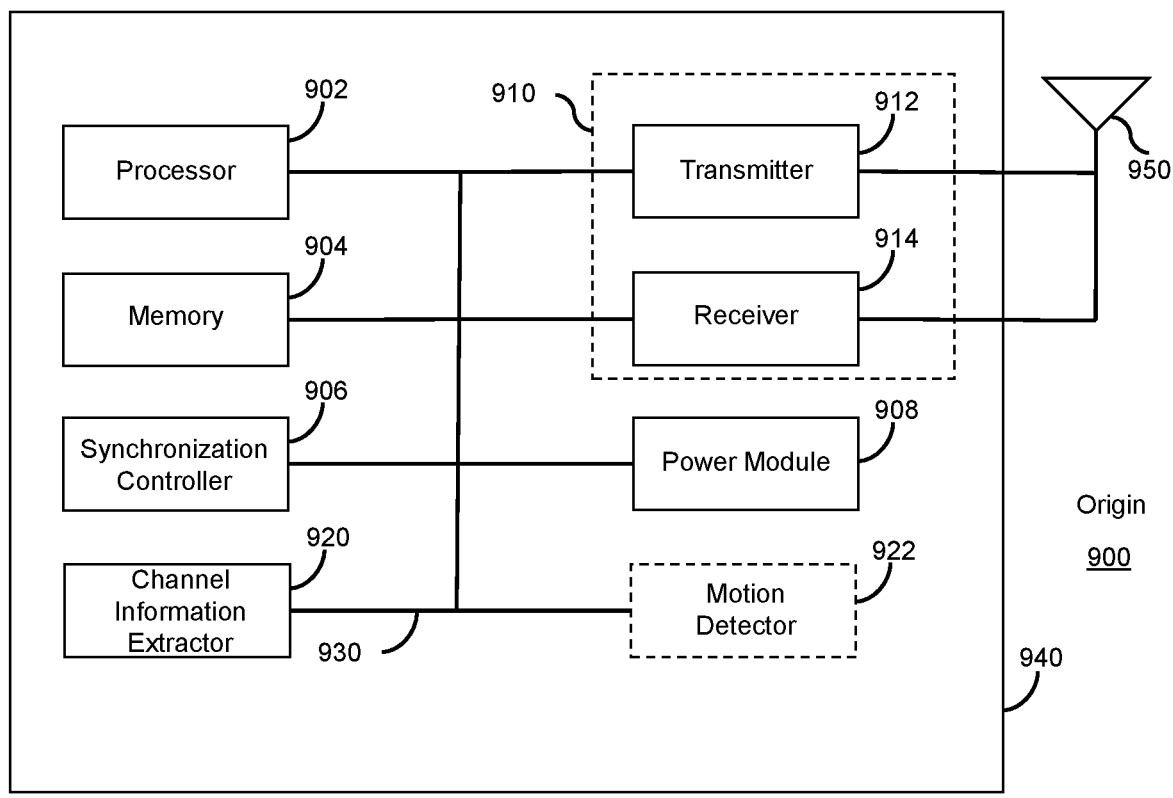
FIG. 9 illustrates an exemplary block diagram of a second wireless device of a wireless motion monitoring system, according to some embodiments of the present disclosure.

FIG. 9 illustrates an exemplary block diagram of a second wireless device, e.g. an Origin 900, of a wireless motion monitoring system, according to one embodiment of the present teaching. The Origin 900 is an example of a device that can be configured to implement the various methods described herein. The Origin 900 in this example may serve as a receiver, or Rx, or Origin in any one of FIGS. 1-6 for wireless motion monitoring in a venue. As shown in FIG. 9, the Origin 900 includes a housing 940 containing a processor 902, a memory 904, a transceiver 910 comprising a transmitter 912 and a receiver 914, a power module 908, a synchronization controller 906, a channel information extractor 920, and an optional motion detector 922.

In this embodiment, the processor 902, the memory 904, the transceiver 910 and the power module 908 work similarly to the processor 802, the memory 804, the transceiver 810 and the power module 808 in the Bot 800. An antenna 950 or a multi-antenna array 950 is typically attached to the housing 940 and electrically coupled to the transceiver 910.

The Origin 900 may be a second wireless device that has a different type from that of the first wireless device (e.g. the Bot 800). In particular, the channel information extractor 920 in the Origin 900 is configured for receiving the wireless signal through the wireless channel, and obtaining a time series of channel information (CI) of the wireless channel based on the wireless signal. The channel information extractor 920 may send the extracted CI to the optional motion detector 922 or to a motion detector outside the Origin 900 for wireless motion monitoring in the venue.

The motion detector 922 is an optional component in the Origin 900. In one embodiment, it is within the Origin 900 as shown in FIG. 9. In another embodiment, it is outside the Origin 900 and in another device, which may be a Bot, another Origin, a cloud server, a fog server, a local server, and an edge server. The optional motion detector 922 may be configured for detecting and monitoring motions in the venue based on object motion information, which may be computed based on the time series of CI by the motion detector 922 or another motion detector outside the Origin 900.

The synchronization controller 906 in this example may be configured to control the operations of the Origin 900 to be synchronized or un-synchronized with another device, e.g. a Bot, another Origin, or an independent motion detector. In one embodiment, the synchronization controller 906 may control the Origin 900 to be synchronized with a Bot that transmits a wireless signal. In another embodiment, the synchronization controller 906 may control the Origin 900 to receive the wireless signal asynchronously with other Origins. In another embodiment, each of the Origin 900 and other Origins may receive the wireless signals individually and asynchronously. In one embodiment, the optional motion detector 922 or a motion detector outside the Origin 900 is configured for asynchronously computing respective heterogeneous motion information based on the respective time series of CI.

The various modules discussed above are coupled together by a bus system 930. The bus system 930 can include a data bus and, for example, a power bus, a control signal bus, and/or a status signal bus in addition to the data bus. It is understood that the modules of the Origin 900 can be operatively coupled to one another using any suitable techniques and mediums.

Although a number of separate modules or components are illustrated in FIG. 9, persons of ordinary skill in the art will understand that one or more of the modules can be combined or commonly implemented. For example, the processor 902 can implement not only the functionality described above with respect to the processor 902, but also implement the functionality described above with respect to the channel information extractor 920. Conversely, each of the modules illustrated in FIG. 9 can be implemented using a plurality of separate components or elements.

Figure 10:
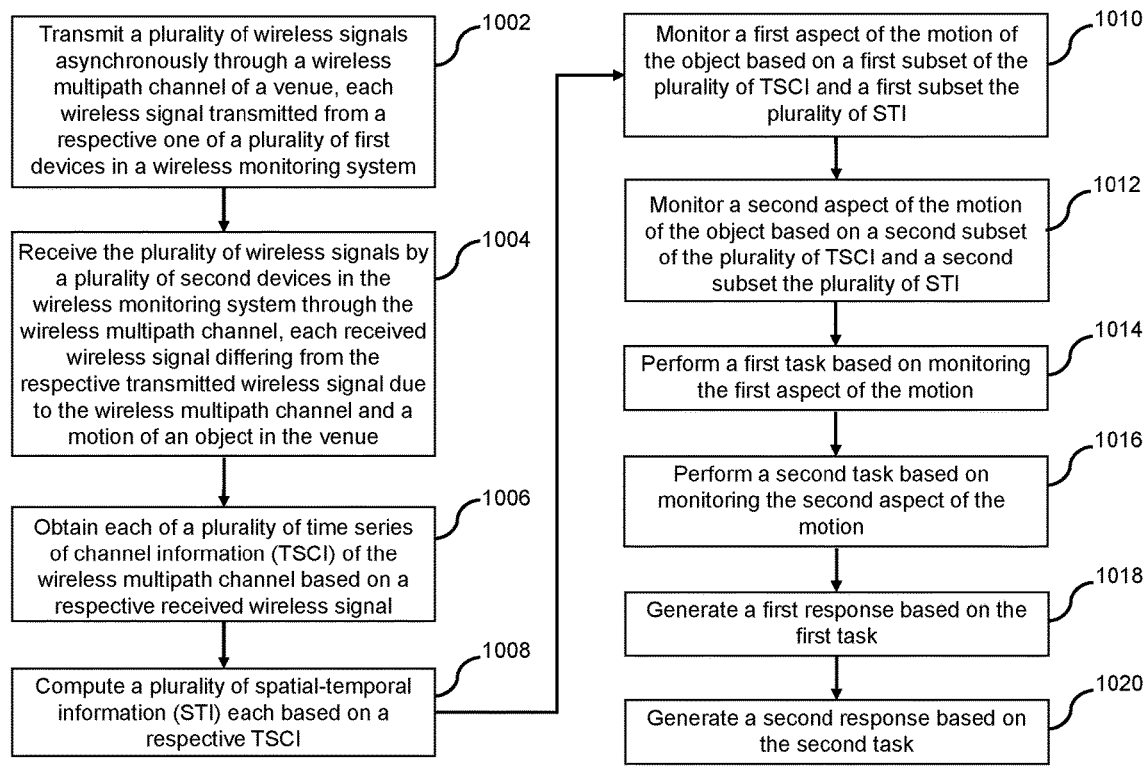
FIG. 10 illustrates a flow chart of an exemplary method for wireless motion monitoring, according to some embodiments of the present disclosure.

FIG. 10 illustrates a flow chart of an exemplary method 1000 for wireless motion monitoring, according to some embodiments of the present disclosure. At operation 1002, a plurality of wireless signals are transmitted asynchronously through a wireless multipath channel of a venue, where each wireless signal is transmitted from a respective one of a plurality of first devices in a wireless monitoring system. At operation 1004, the plurality of wireless signals are received by a plurality of second devices in the wireless monitoring system through the wireless multipath channel, where each received wireless signal differs from the respective transmitted wireless signal due to the wireless multipath channel and a motion of an object in the venue. At operation 1006, each of a plurality of time series of channel information (TSCI) of the wireless multipath channel is obtained based on a respective received wireless signal. At operation 1008, each of a plurality of spatial-temporal information (STI) is computed based on a respective TSCI. At operation 1010, a first aspect of the motion of the object is monitored based on a first subset of the plurality of TSCI and a first subset the plurality of STI. At operation 1012, a second aspect of the motion of the object is monitored based on a second subset of the plurality of TSCI and a second subset the plurality of STI. At operation 1014, a first task is performed based on monitoring the first aspect of the motion. At operation 1016, a second task is performed based on monitoring the second aspect of the motion. At operation 1018, a first response is generated based on the first task. At operation 1020, a second response is generated based on the second task. The order of the operations in FIG. 10 may be changed according to various embodiments of the present teaching.

The following numbered clauses provide implementation examples for wirelessly monitoring object motion.

Clause 1. A method/system/software/device of a wireless monitoring system, comprising: transmitting a wireless signal from a Type1 heterogeneous wireless device through a wireless multipath channel of a venue, wherein the wireless multipath channel is impacted by a motion of an object in the venue, receiving the wireless signal by a Type2 heterogeneous wireless device through the wireless multipath channel based on a processor, a memory and a set of instructions, wherein the received wireless signal differs from the transmitted wireless signal due to the wireless multipath channel of the venue and the object motion; obtaining a time series of channel information (TSCI) of the wireless multipath channel based on the received wireless signal using a processor, a memory communicatively coupled with the processor and a set of instructions stored in the memory; computing a spatial-temporal information (STI) based on the TSCI; monitoring the object motion based on the TSCI and the STI; performing a task based on the monitoring; and generating a response based on the task.

Clause 2. The method/system/software/device of the wireless monitoring system of clause 1, further comprising: wherein there are a plurality of Type1 heterogeneous wireless devices; transmitting a plurality of wireless signals asynchronously through the wireless multipath channel of the venue, each wireless signal from a respective Type1 heterogeneous wireless device, receiving the plurality of wireless signals by the Type2 device through the wireless multipath channel, wherein each received wireless signal differs from the respective transmitted wireless signal due to the wireless multipath channel of the venue and the object motion; obtaining a plurality of TSCI of the wireless multipath channel each based on a respective received wireless signal; computing a plurality of STI each based on a respective TSCI; and performing at least one of: monitoring the object motion in the venue individually (individual monitoring) based on at least one of: a TSCI and the associated STI, performing the task based on individual monitoring applied to at least one TSCI, monitoring the object motion jointly (joint monitoring) based on at least one of: a subset of the plurality of TSCI comprising more than one TSCI, the STI associated with the subset of TSCI, a first joint STI computed based on the subset of TSCI, or a second joint STI computed based on at least two of any STI, performing the task based on joint monitoring applied to at least one subset of the TSCI each comprising more than one TSCI, monitoring the object motion based on a combination of individual monitoring and joint monitoring, performing the task based on a combination of individual monitoring and joint monitoring, sharing at least one of: a TSCI, a processed TSCI, a part of a TSCI, a feature of a TSCI, a STI, a joint STI, or an analytics computed based on any of these, monitoring a first aspect of the object motion based on a first subset of the TSCI and a second aspect of the object motion based on a second subset of the TSCI, performing a first subtask of the task based on monitoring the first aspect of the object motion and a second subtask of the task based on monitoring the second aspect of the object motion, or performing a first task based on monitoring the first aspect of the object motion and a second task based on monitoring the second aspect of the object motion.

Clause 3. The method/system/software/device of the wireless monitoring system of clause 1, further comprising: wherein there are a plurality of Type2 heterogeneous wireless devices; receiving the wireless signal by each Type2 device through the wireless multipath channel, wherein each received wireless signal differs from the respective transmitted wireless signal due to the wireless multipath channel of the venue and the object motion; obtaining a plurality of TSCI of the wireless multipath channel each by a respective Type2 device based on the respective received wireless signal; computing a plurality of STI each based on a respective TSCI; and perform at least one of: monitoring the object motion in the venue individually (individual monitoring) based on at least one of: a TSCI and the associated STI, performing the task based on individual monitoring applied to at least one TSCI, monitoring the object motion jointly (joint monitoring) based on at least one of: a subset of TSCI comprising more than one TSCI, the STI associated with the subset of TSCI, a first joint STI computed based on the subset of TSCI, or a second joint STI computed based on at least two of any STI, performing the task based on joint monitoring applied to at least one subset of the TSCI each comprising more than one TSCI, monitoring the object motion based on a combination of individual monitoring and joint monitoring, performing the task based on a combination of individual monitoring and joint monitoring, sharing at least one of: a TSCI, a processed TSCI, a part of a TSCI, a feature of a TSCI, a STI, a joint STI, or an analytics computed based on any of these, monitoring a first aspect of the object motion based on a first subset of the TSCI and a second aspect of the object motion based on a second subset of the TSCI, performing a first subtask of the task based on monitoring the first aspect of the object motion and a second subtask of the task based on monitoring the second aspect of the object motion.

Clause 4. The method/system/software/device of the wireless monitoring system of clause 1, further comprising: wherein there are a plurality of heterogeneous wireless devices each being: Type1, Type2, or both; transmitting a plurality of wireless signals asynchronously through the wireless multipath channel of the venue, each wireless signal from a respective Type1 device, receiving the plurality of wireless signals by the Type2 devices through the wireless multipath channel, wherein each received wireless signal by a Type2 device differs from the respective transmitted wireless signal due to the wireless multipath channel of the venue and the object motion; obtaining a plurality of TSCI of the wireless multipath channel each based on a respective received wireless signal; computing a plurality of STI each based on a respective TSCI; and perform at least one of: monitoring the object motion in the venue individually (individual monitoring) based on at least one of: a TSCI and the associated STI, performing the task based on individual monitoring applied to at least one TSCI, monitoring the object motion jointly (joint monitoring) based on at least one of: a subset of TSCI comprising more than one TSCI, the STI associated with the subset of TSCI, a first joint STI computed based on the subset of TSCI, or a second joint STI computed based on at least two of any STI, performing the task based on joint monitoring applied to at least one subset of the TSCI each comprising more than one TSCI, monitoring the object motion based on a combination of individual monitoring and joint monitoring, performing the task based on a combination of individual monitoring and joint monitoring, sharing at least one of: a TSCI, a processed TSCI, a part of a TSCI, a feature of a TSCI, a STI, a joint STI, or an analytics computed based on any of these, monitoring a first aspect of the object motion based on a first subset of the TSCI and a second aspect of the object motion based on a second subset of the TSCI, performing a first subtask of the task based on monitoring the first aspect of the object motion and a second subtask of the task based on monitoring the second aspect of the object motion.

Clause 5. The method/system/software/device of the wireless monitoring system of clause 1 or 2 or 3 or 4, further comprising: wherein each TSCI is associated with a respective Type1 device and a respective Type2 device; associating the respective Type1 device with the respective Type2 device based on at least one of: an instruction of a user, a command from a user device of the user, a user directive from a software of the user device, a QR code on any one of the heterogeneous wireless devices, an identification of each device, a code associated with each device, attributes of the devices comprising at least one of: their types, hardware configuration, processor, memory, computing power, antennas, housing, enclosure, power supply, software configuration, capabilities, supported tasks, supported subtasks, supported sounding, supported signaling, supported wireless signals, supported communication protocols, power rating, or location, installation locations relative to a map of the venue, a mesh network associated with the user, a mesh network comprising the heterogeneous wireless devices, a mesh network constructed by at least one of: the user, a server, a software or an optimization procedure, a mesh network associated with at least one of: a tree structure, a linked list, an arrow tree structure, an ordered link list, a tree structure in which each node is associated with a respective heterogeneous wireless device, a tree structure in which each branch is associated with a respective TSCI, an arrow tree structure in which each directed branch (arrow) is associated with a respective TSCI, a tree structure with all outer nodes (leaf nodes) being associated with Type1 devices, a tree structure with all outer nodes being associated with Type2 devices, a tree structure with at least one inner node (branch node) being associated a device that is both Type1 and Type2, a tree structure with at least one internal branch associated with two devices each of which is both Type1 and Type2, or a linked list with each link being associated with a respective TSCI, etc.

Clause 6. The method/system/software/device of the wireless monitoring system of clause 1 or 2 or 3 or 4, further comprises: wherein there are at least one supported operating modes associated with the task; choosing an operating mode of the task to a current mode, wherein the current mode is one of the supported operating modes; monitoring at least one aspect of the object based on the TSCI based on the current operating mode; generating the response based on the current operating mode of the task.

Clause 7. The method/system/software/device of the wireless monitoring system of clause 6, further comprises: changing the operating mode of the task from the current mode to a next mode which is another one of the supported operating modes based on at least one of: a choice of a user of the system, a preference of the user, an input on a user device by the user, a selection on a user-interface (UI) by the user, a button press on the UI by the user, a verbal selection by the user, a finite state machine (FSM) comprising at least one state each associated with a respective supported operating mode, a finite state machine (FSM) comprising a state associated with a sequence of supported operating modes, the at least one aspect of the object being monitored in the current mode, a time table associated with at least one of: the task, the user, the object, or the venue, a presence or absence of the user in the venue, a communication with another system, a power-on, a power interruption, a system reset, or a power saving need of the system.

Clause 8. The method/system/software/device of the wireless monitoring system of clause 6, further comprises: in an operating mode for monitoring the venue when a user of the system is not present in the venue: performing at least one of the following configuration for the object motion monitoring for the operating mode, with the object being an intruder: configuring a sensitivity setting of the object motion monitoring, enabling or disabling at least one of: the Type1 device or at least one other Type1 device, configuring time table for the operating mode with respective configurations associated with respective time periods of the time table, configuring parameters, thresholds and timings for the operating mode, configuring a method and mode of notification for the user, or configuring the object motion monitoring to monitor an aspect of the object mode associated with the operating mode; monitoring the TSCI and the STI for patterns pointing to a presence of the intruder; configuring the response to comprise at least one of: sending a notification to a designated user, generating an alarm, generating an alarm animation, playing a warning message, conducting a dialog with the intruder, requesting the intruder to produce an identification of the authorized user, sounding a siren of the system, or securing the venue.

Clause 9. The method/system/software/device of the wireless monitoring system of clause 6, further comprises: in an operating mode for monitoring the venue when a user is present in the venue: performing at least one of the following configuration for the object motion monitoring for the operating mode, with the object being the user: configuring a sensitivity setting of the object motion monitoring, enabling or disabling at least one of: the Type1 device or at least one other Type1 device, configuring time table for the operating mode with respective configurations associated with respective time periods of the time table, configuring parameters, thresholds and timings for the operating mode, configuring a method and mode of notification for the user, or configuring the object motion monitoring to monitor an aspect of the object mode associated with the operating mode; monitoring activities of the user in the venue based on the TSCI and the STI; configuring the response to comprise at least one of: locating the user, monitoring movement of the user, monitoring at least one of: a daily routine, a habit or a behavior, of the user, monitoring any deviation from at least one of: the daily routine, the habit or the behavior, of the user, detecting an additional user.

Clause 10. The method/system/software/device of the wireless monitoring system of clause 6, further comprises: in an operating mode for monitoring the venue when a user of the system is not present in the venue and the user does not want siren: performing at least one of the following configuration for the object motion monitoring for the operating mode, with the object being an intruder: configuring a sensitivity setting of the object motion monitoring, enabling or disabling at least one of: the Type1 device or at least one other Type1 device, configuring time table for the operating mode with respective configurations associated with respective time periods of the time table, configuring parameters, thresholds and timings for the operating mode, configuring a method and mode of notification for the user, or configuring the object motion monitoring to monitor an aspect of the object mode associated with the operating mode; monitoring the TSCI and the STI for patterns pointing to a presence of the intruder, wherein the response to comprise at least one of: sending a notification to a designated user, generating an alarm, generating an alarm animation, playing a warning message, conducting a dialog with the intruder, requesting the intruder to produce an identification of the authorized user, sounding a siren of the system, or securing the venue; configuring the response to exclude at least one of: generating an alarm, generating an alarm animation, playing a warning message, conducting a dialog with the intruder, requesting the intruder to produce an identification of the authorized user, sounding a siren of the system, or securing the venue.

Clause 11. The method/system/software/device of the wireless monitoring system of clause 6, further comprises: in an operating mode for monitoring the venue when a user of the system is not present in the venue and the user wants to be notified of any detected object motion: performing at least one of the following configuration for the object motion monitoring for the operating mode, with the object being an intruder: configuring a sensitivity setting of the object motion monitoring, enabling or disabling at least one of: the Type1 device or at least one other Type1 device, configuring a time table associated with the operating mode with respective configurations associated with respective time periods of the time table, configuring parameters, thresholds and timings for the operating mode, configuring a method and mode of notification for the user, or configuring the object motion monitoring to monitor an aspect of the object mode associated with the operating mode; monitoring the TSCI and the STI for patterns pointing to a presence of the intruder; configuring the response to comprise at least one of: sending a notification to the user, taking further action upon a confirmation of the user, switching to another operating mode.

Clause 12. The method/system/software/device of the wireless monitoring system of clause 6, further comprises: in an operating mode for monitoring the venue, pausing or stopping at least one of: the transmitting of the wireless signal from the Type1 device, the receiving of the wireless signal by the Type2 device, the obtaining of the TSCI based on the received wireless signal, the computing of the STI based on the TSCI, the monitoring of the object motion based on the TSCI and the STI, the performing of the task, or the generating of the response based on the task.

Clause 13. The method/system/software/device of the wireless monitoring system of clause 6, further comprises: in an operating mode for monitoring the venue when object motion is detected in the venue and the object is unidentified: configuring the response to comprise at least one of: sending a notification to a designated user, generating an alarm, generating an alarm animation, playing a warning message, conducting a dialog with the intruder, requesting the intruder to produce an identification of the authorized user, securing the venue, or switching to another operating mode; monitoring the object motion in reaction to the response.

Clause 14. The method/system/software/device of the wireless monitoring system of clause 1 or 2 or 3 or 4, further comprises: receiving an emergency message; performing at least one of the following emergency actions based on the emergency message: initiating an evacuation, actuating emergency warning system, mobilizing emergency response system, turning on emergency lighting, triggering emergency broadcasting system, setting off emergency messaging system, activating priority notification system, sounding a siren, sounding an audio alarm, displaying a visual alarm, animating an animated alarm, generating notification or personalized alarm to at least one of: the user, one or more designated contact person, requesting emergency service, or requesting dispatch of at least one first responder (e.g. police, fireman, ambulance, paramedic) to at least one of: the venue, a designated location, a home address of the user, or a current location of the user.

Clause 15. The method/system/software/device of the wireless monitoring system of clause 14, further comprises: receiving an emergency-cancellation message within a time window after emergency message is received; terminating an emergency action based on the emergency-cancellation message.

Clause 16. The method/system/software/device of the wireless monitoring system of clause 14, further comprises: generating the emergency message based on at least one of: pressing a dedicated hardware button, pressing a dedicated hardware siren button, pressing a dedicated hardware panic button, an input device comprising at least one of: a user device of a user of the system or a dedicated hardware, a user interface (UI) of the input device, a pressing and holding down of a UI-object on the input device for a period of time, an extended depression of a button on the input device, a swipe on the input device, a customized pattern drawn on the input device by the user, a gesture of the user near the input device, a confirmed pressing of a button on the input device, a confirmed selection of an object in a user software on the input device.

Clause 17. The method/system/software/device of the wireless monitoring system of clause 14, further comprises: receiving the emergency message via at least one of: a network, local area network, broadband network, internet, cloud network, wireless local area network, WiFi, Bluetooth, BLE, Zigbee, Z-Wave, mobile communication network, 2G, 3G, 4G, LTE, 5G, 6G, 7G, 8G, text messaging system, instant messaging system, conferencing system, notification system, announcement system, bulletin board, email, SMS, MMS, Apple Facetime, Facebook Messenger, Google Hangout, Line, Instagram, Zoom, Google Hangout, WebEx, etc.

Clause 18. The method/system/software/device of the wireless monitoring system of clause 1 or 2 or 3 or 4, further comprises: receiving an emergency message; performing at least one of the following emergency actions based on the emergency message.

Clause 19. The method/system/software/device of the wireless monitoring system of clause 1 or 2 or 3 or 4: wherein at least one of the Type1 device or the Type2 device is a single-purpose device with the sole purpose being to perform its role in the wireless monitoring system.

Clause 20. The method/system/software/device of the wireless monitoring system of clause 19, further comprising: changing its role in the wireless monitoring system based on at least one of: a software update, firmware update, software upgrade, or over-the-air software upgrade.

Clause 21. The method/system/software/device of the wireless monitoring system of clause 20, further comprising: wherein the device is configured for a first functionality in its role in the wireless monitoring system initially; changing its role in the wireless monitoring system by at least one of: introducing additional devices to the system and configuring the device to interact with the additional devices in the wireless monitoring system, changing the first functionality, adjusting the first functionality, replacing the first functionality by a second functionality, or adding the second functionality.

Clause 22. The method/system/software/device of the wireless monitoring system of clause 1: wherein at least one of the Type1 device or the Type2 device is a multi-purpose device with a first purpose being to perform its role in the wireless monitoring system and a second purpose unrelated to the wireless monitoring.

Clause 23. The method/system/software/device of the wireless monitoring system of clause 22: wherein the second purpose is the primary purpose of the device.

Clause 24. The method/system/software/device of the wireless monitoring system of clause 22, further comprising: wherein the device is initially configured for the second purpose without the first purpose; upgrading the configuration of the device to add the second purpose.

Clause 25. The method/system/software/device of the wireless monitoring system of clause 22: wherein between the Type1 device and the Type2 device, one device is a single-purpose device and the other device is a multi-purpose device.

Clause 26. The method/system/software/device of the wireless monitoring system of clause 1: wherein at least one of the Type1 device or the Type2 device is attached to an accessory based on at least one of: a locking mechanism, bayonet coupling, screw coupling, push-pull coupling, breakaway coupling, push-and-press-to-release coupling, coupling locked by screw, push-push locked coupling, magnetic coupling, electro-magnet, magnet, attachable mechanism, detachable mechanism, linking mechanism, binding mechanism, coupling, connector, network connector, Ethernet connector, bus connector, USB connector, Firewire connector, Lightning connector, mechanical holder, suction feature, suction cup, peg, clip, staple, ring, pin, hook, loop, snap-lock hook, snap-on hook, bracket, hanger, mount, chain, track-and-trolley, screw, nut-and-screw, nut-and-bolt, velcro, hook-and-loop, adhesive, pressure sensitive adhesive (PSA), self-adhesive tape, adhesive tape, double-side adhesive tape, sticky tape, fastener, dual-lock fastener, self-mating fastener, reclosable fastener, resting on top by at least one of: gravity, weight, and friction, and another attachment mechanism.

Clause 27. The method/system/software/device of the wireless monitoring system of clause 26: wherein the accessory has no power source.

Clause 28. The method/system/software/device of the wireless monitoring system of clause 26: wherein the accessory comprises at least one power source.

Clause 29. The method/system/software/device of the wireless monitoring system of clause 28: wherein the at least one Type1 or Type2 is powered by obtaining power from the accessory.

Clause 30. The method/system/software/device of the wireless monitoring system of clause 1: wherein at last one of the Type1 device or the Type2 device is communicatively coupled with at least one of: a wired network or a wireless network.

Clause 31. The method/system/software/device of the wireless monitoring system of clause 1: wherein at least one of the Type1 device or the Type2 has a power source comprising at least one of: AC power source, DC power source, power from another device, use-once power source, reusable power source, rechargeable power source, battery, rechargeable battery, non-rechargeable battery, replaceable battery, irreplaceable battery, use-once battery, disposable battery, solar power source, solar panel, chemical power source, electro-chemical energy source, thermal energy storage, electro-thermal energy source, magnetic energy storage, electro-magnetic energy source, mechanical energy source, electro-mechanical energy source, gravitational energy source, hydraulic energy source, pneumatic energy, capacitor, inductor, flywheel, generator, compressed air, energy storage, and another power source.

Clause 32. The method/system/software/device of the wireless monitoring system of clause 1: setting up the Type1 device and the Type2 device, where at least one of: the Type2 device is set up before the Type1 device, the Type1 device is set up before the Type2 device, or the Type1 device and Type2 device are set up together.

Clause 33. The method/system/software/device of the wireless monitoring system of clause 32: setting up the Type2 device by performing at least one of: (to get the Type2 device to access local network) scanning a QR code associated with the Type2 device, scanning a QR code printed on a surface of the Type2 device, configuring the Type2 device to function as an access point (AP) to establish a first network with a first network identification (ID), associating with the Type2 device in the first network, handshaking with the Type2 device in the first network, performing probe request-and-response handshake with the Type2 device in the first network, performing authentication request-and-response handshake with the Type2 device in the first network, performing association request-and-response handshake with the Type2 device in the first network, accessing a particular network address and a particular network port, accessing a webpage at a particular web address in the first network, directing the Type2 device to connect to a second network with a second network ID in the venue as a client using a particular access procedure and a particular access code, rebooting the Type2 device, (to get the Type2 device to access cloud server using the local network) configuring the Type2 device to gain access to internet through the second network, configuring the Type2 device to access a cloud server through at least one of: the second network or the internet, registering at least one of: the Type2 device, its hardware, its software configuration, its capabilities or its limitations in a database of the wireless monitoring system, associating the Type2 device with the task, associating the Type2 device with the monitoring of the object motion in the venue, associating the Type2 device with at least one of: a user, a user account, the venue, an address of the venue, an address of the user, a location of the user, a location of the Type2 device in the venue, a map of the venue, a name of the Type2 device, or an identification (ID) of the Type2 device, propagating an information of the Type2 device to the rest of the wireless monitoring system, (to get the Type2 device to function as Type2 device to receive/obtain/analyze wireless signals or TSCI from wireless signals and monitor object motion based on TSCI extracted from wireless signals, and to possibly cooperate/coordinate with other devices/Type2 devices) configuring the Type2 device to receive the wireless signals from at least one Type1 device in a network, wherein the wireless signals are subjected to at least one requirement or specification associated with the monitoring and/or the task, configuring the Type2 device to extract TSCI from the wireless signals from any Type1 device in a network, configuring the Type2 device based on at least one of: a security protocol, a software update protocol, a firmware update protocol, a hardware/software configuration of the Type2 device (e.g. an integrated circuit (IC) of the Type2 device, processor, memory, clock frequency, hardware/software/firmware version, capability of hardware/firmware/software, etc.), an accessory of the Type2 device, a realization of the Type2 device, a housing of the Type2 device, a power source of the Type2 device, an antenna of the Type2 device, an installation of the Type2 device, a placement of the Type2 device, a planning of network traffic, a network requirement, and/or a user preference, configuring the Type2 device to function as at least one of: an access point (AP), a station (STA), a client, or a peer, in a third network with a third network ID in which the Type1 device transmits the wireless signal to the Type2 device in the wireless multipath channel of the venue, directing the Type2 device to cooperate or coordinate with at least one of: at least one other Type2 device of the wireless monitoring system, at least one other Type2 device of another wireless monitoring system, another monitoring system, and/or another system, directing the Type2 device to coordinate with at least one other Type2 device regarding the transmission of wireless signals received by the Type2 devices, coordinate at least one of: timing, frequency, phase, synchronization, timing offset, delay, frequency bands, frequency hopping, signaling, transmission settings, transmitting antennas, receiving antennas, signal choices, signal strength, protocols, sounding mechanism, sounding frequency, and/or sounding timing, associated with the wireless signals received by the Type2 device and the at least one other Type2 device, organizing the Type2 device and at least one other Type2 device into at least one of: a daisy chain, a mesh network, or a network of networks, computing a best way to organize the Type2 device and the at least one other Type2 device, registering at least one of: the organization or the coordination of the Type2 device and the at least one Type2 device in the database of the wireless monitoring system, propagating an information of the organization or the coordination to the rest of the wireless monitoring system, (to get the Type2 device to discover and pair with the Type1 device or other Type1 devices) directing the Type2 device to discover and pair with any Type1 devices in the third network, directing the Type2 device to be discoverable in the third network, pairing the Type2 device with another device in order for the another device to transmit some wireless signal to the Type2 device for wireless monitoring purpose, registering the pairing in the database of the wireless monitoring system, registering at least one of: the paired Type1 device, its hardware configuration, its software configuration, its capabilities and/or its limitations in the database of the wireless monitoring system, propagating an information of the pairing to the rest of the wireless monitoring system, configuring the Type2 device to pair or authenticate or associate with at least one of: the Type1 device, at least one other Type1 device, and/or another Type2 device, cooperating or coordinating with the paired device(s) so that wireless signal(s) subjected to a requirement or a specification are transmitted to the Type2 device for wireless monitoring purpose, providing feedback and/or instructions to the paired devices, transmitting at least one of: an identification, a status, a data, a probe, a request, a response, an acknowledge, a notification, a handshake to a paired device, obtaining at least one of: an identification, a status, a data, a probe, a request, a response, an acknowledge, a notification, a handshake from a paired device, computing a best way to organize all the Type1 device(s) and all the Type2 device(s), wherein the organization comprises the pairwise pairings between one of the Type1 devices and one of the Type2 devices, and the settings associated with wireless signal transmitted from any Type1 device to any Type2 device, registering the organization in the database of the wireless monitoring system, propagating an information of the organization to the rest of the wireless monitoring system, sharing information with other device(s) and/or other system(s), sharing information with at least one of: a Type1 device, sharing information with the paired device, and/or another configuration of the Type2 device.

Clause 34. The method/system/software/device of the wireless monitoring system of clause 32: setting up the Type1 device by performing at least one of: directing the Type2 device to discover and pair the Type1 device, directing the Type2 device to be discoverable, directing the Type1 device to discover and pair with the Type2 device, directing the Type1 device to discover and pair with the Type2 device in a third network associated with the Type2 device, directing the Type1 device to discover and pair with another Type2 devices, directing the Type1 device to discover and pair with another Type2 device in another network associated with another Type2 device, directing the Type1 device to be discoverable, directing the Type1 device to be discoverable in a third network associated with the Type2 device, pairing the Type1 device with at least one of: the Type2 device or another Type2 device to transmit respective wireless signal to the respective Type2 device for wireless monitoring purpose, cooperating or coordinating or negotiating or handshaking with the Type2 device in the transmission of the wireless signal from the Type1 device to the Type2 device, cooperating or coordinating or negotiating or handshaking with a paired Type2 device(s) or an unpaired Type2 device(s) in the transmission of any wireless signals from any Type1 device(s) to the Type2 device(s), cooperating or coordinating or negotiating or handshaking with at least one other Type1 device in the transmission of wireless signals by any Type1 devices to a paired Type2 device, or an unpaired Type2 device, cooperating or coordinating or negotiating or handshaking regarding at least one of: timing, frequency, phase, synchronization, timing offset, delay, frequency bands, frequency hopping, signaling, transmission settings, transmitting antennas, receiving antennas, signal choices, signal strength, protocols, sounding mechanism, sounding frequency, and/or sounding timing, associated with the wireless signals received by the paired Type2 device or the another Type2 device, or another configuration of the Type1 device.

Clause 35. The method/system/software/device of the wireless monitoring system of clause 32: labeling at least one of: the Type1 device, a location associated with the Type1 device, a region associated with the Type1 device, the Type2 device, a location associated with the Type2 device, a region associated with the Type2 device, the pair of the Type1 device and the Type2 device, a location associated with the pair, or a region associated with the pair.

Clause 36. The method/system/software/device of the wireless monitoring system of clause 35: generating the label during a set-up stage based on an input of the user.

Clause 37. The method/system/software/device of the wireless monitoring system of clause 35: generating the label after a set-up stage based on at least one of: the TSCI, the STI, the task, the response, at least one analytics computed based on at least one of: the TSCI or the STI, at least one location analytics, motion analytics, statistics, and/or motion statistics computed based on the TSCI and the STI, a history of the at least one analytics, or an analysis of at least one of: the TSCI, the STI, the at least one analytics over time, or the history of analytics.

Clause 38. The method/system/software/device of the wireless monitoring system of clause 35: wherein one of the Type1 device and the Type2 device is a multi-purpose device with a second purpose unrelated to the wireless monitoring; wherein an auxiliary data is generated by the device for the second purpose; generating the label after a set-up stage based on the auxiliary data.

Clause 39. The method/system/software/device of the wireless monitoring system of clause 1: wherein the venue comprises at least one of: a floor of a multi-floor structure, more than one floors of the multi-floor structure, an interior space of a structure, or an immediate neighboring exterior space of the structure.

Clause 40. The method/system/software/device of the wireless monitoring system of clause 2: wherein the Type2 device and the plurality of Type1 device form a star configuration.

Clause 41. The method/system/software/device of the wireless monitoring system of clause 3: wherein the Type1 device and the plurality of Type2 device form a star configuration.

Clause 42. The method/system/software/device of the wireless monitoring system of clause 4: wherein each Type2 device is paired with at least one associated Type1 device each transmitting a respective wireless signal to the Type2 device, the Type2 device and the at least one associated Type1 device forming a star topology.

Clause 43. The method/system/software/device of the wireless monitoring system of clause 42: wherein a particular Type2 device is further paired with at least one associated Type2 device that is both Type1 and Type2, each associated Type2 device transmitting a respective wireless signal to the Type2 device; wherein the particular Type2 device together with the at least one associated Type1 device and the at least one associated Type2 device form a star topology.

Clause 44. The method/system/software/device of the wireless monitoring system of clause 4: wherein a first Type2 device is further paired with a second Type2 device which is both Type1 and Type2, the second Type2 device transmitting a respective wireless signal to the first Type2 device; wherein the second Type2 device is further paired with a third Type2 device which is both Type1 and Type2, the third Type2 device transmitting a respective wireless signal to the second Type2 device; wherein the first, second and third Type2 devices form a daisy chain.

Clause 45. The method/system/software/device of the wireless monitoring system of clause 1 or 2 or 3 or 4, further comprising: adding another Type1 heterogeneous wireless device to the system; pairing the another Type1 device with an existing Type2 device in the system; transmitting another wireless signal from the another Type1 device through the wireless multipath channel of the venue, receiving the another wireless signal by the existing Type2 device through the wireless multipath channel, wherein the received another wireless signal differs from the transmitted another wireless signal due to the wireless multipath channel of the venue and the object motion; obtaining another TSCI of the wireless multipath channel based on the received another wireless signal; computing another spatial-temporal information (STI) based on the another TSCI; monitoring the object motion based on the another TSCI and the another STI; performing the task based on the monitoring; and generating the response based on the task.

Clause 46. The method/system/software/device of the wireless monitoring system of clause 45, further comprising: setting up the another Type1 device by at least one of: directing the existing Type2 device to discover and pair with the another Type1 device, directing the existing Type2 device to be discoverable, directing the another Type1 device to discover and pair with the existing Type2 device, directing the another Type1 device to be discoverable, pairing the another Type1 device with the existing Type2 device, registering the another Type1 device and its pairing with the existing Type2 device in a database of the wireless monitoring system, propagate an information of the another Type1 device and the pairing to the rest of the wireless monitoring system, cooperating or coordinating or negotiating or handshaking with the existing Type2 device in the transmission of the another wireless signal from the another Type1 device to the existing Type2 device, coordinate at least one of: timing, frequency, phase, synchronization, timing offset, delay, frequency bands, frequency hopping, signaling, transmission settings, transmitting antennas, receiving antennas, signal choices, signal strength, protocols, sounding mechanism, sounding frequency, and/or sounding timing, associated with the another wireless signal transmitted by the another Type1 device to the existing Type2 device, computing a best way to organize all the Type1 and Type2 devices, adding a label associated with at least one of: the another Type1 device, and the pair of another Type1 device and the existing Type2 device, associating the another Type1 device with at least one of: a user, a user account, the venue, an address of the venue, an address of the user, a location of the user, a location of the another Type1 device in the venue, a map of the venue, a name of the another Type1 device, or an identification (ID) of the another Type1 device, etc.

Clause 47. The method/system/software/device of the wireless monitoring system of clause 1 or 2 or 3 or 4, further comprising: removing a Type1 device currently paired with a Type2 device.

Clause 48. The method/system/software/device of the wireless monitoring system of clause 47, further comprising: setting up the system for the removal of the Type1 device; adjust the monitoring of the object motion so that it is performed without the TSCI extracted from the wireless signal transmitted from the Type1 device to the Type2 device; de-registering the Type1 device from the database of the wireless monitoring system, propagating an information of the de-registration to the rest of the system.

Clause 49. The method/system/software/device of the wireless monitoring system of clause 1 or 2 or 3 or 4, further comprising: adding a new Type2 heterogeneous wireless device to the system; and performing at least one of the following: registering the new Type2 device in the database of the wireless monitoring system; propagating an information of the new Type2 device to the rest of the system; adding a new Type1 heterogeneous wireless device; pairing the new Type1 device with the new Type2 device; redirecting an existing Type1 device originally paired with another Type2 device to pair with the new Type2 device; adding the Type2 device to at least one of: a daisy-chain topology, a star topology, a ring topology, a hybrid topology or another topology of the system; pairing the new Type2 device with another Type2 device such that one of the two functions as a Type1 device to transmit a wireless signal to the other of the two; registering any pairing in the database; propagating an information of any pairing to the rest of the system.

Clause 50. The method/system/software/device of the wireless monitoring system of clause 49, further comprising: setting up the system for the addition of the new Type2 device.

Clause 51. The method/system/software/device of the wireless monitoring system of clause 4, further comprising: removing a Type2 heterogeneous wireless device from the system.

Clause 52. The method/system/software/device of the wireless monitoring system of clause 51, further comprising: setting up the system for the removal of the Type2 device; directing a subset of Type1 devices originally paired with the Type2 device to pair with another Type2 device instead; directing the another Type2 device to pair with the subset of Type1 devices; directing the another Type2 device to cooperating or coordinate or negotiate with each of the subset of Type1 device; de-register the removed Type2 device in the database of the wireless monitoring system; propagating an information of the removal to the rest of the system; register the new organization in the database of the wireless monitoring system; propagating an information of the new organization to the rest of the system.

Clause 53. The method/system/software/device of the wireless monitoring system of clause 1 or 2 or 3 or 4, further comprising: managing a set of devices together, wherein the set of devices comprises one of the following: an individual Type1 device, an individual Type2 device, a Type2 device together with the set of its paired Type1 devices, a Type1 device together with the set of its paired Type2 devices, a set of Type2 devices interconnected in a topology together with the sets of their paired Type1 devices, (wherein the topology comprises at least one of: star, daisy chain, tree, ring, hybrid topology), or all the Type1 and Type2 devices together.

Clause 54. The method/system/software/device of the wireless monitoring system of clause 1, further comprising: generating a presentation on a user-interface (UI) of a user device of a user; obtaining a user input from the UI.

Clause 55. The method/system/software/device of the wireless monitoring system of clause 1, further comprising: wherein the UI comprises at least one of: a hierarchical style, a flat style, a hierarchical structure, or a flat structure.

Clause 56. The method/system/software/device of the wireless monitoring system of clause 1, further comprising: wherein the wireless monitoring system is at least one of: a stand-alone system, an add-on to another system, or an integrated subsystem of yet another system.

Clause 57. The method/system/software/device of the wireless monitoring system of clause 1, further comprising: wherein at least one of the Type1 device or the Type2 device comprises at least one of: an audible alarm generator, a dialogue generator, a conversation engine, a siren, a bell, a speaker, a status indicator, a pathway sound indicator, a location sound indicator, a light, a pathway light for safety, a colored light, an alarm light, a warning light, a timed light.

Clause 58. The method/system/software/device of the wireless monitoring system of clause 1: wherein the task comprises at least one of: generating a reminder based on at least one of: a scheduled event, an unread message, an unread news item, a schedule, a time table, subscribed channel news, a user setting, generating a notification based on an event, an alarm clock, a situation, changing a mode of the system based on at least one of: the object motion being monitored, the STI, a plan, a time table, a condition, a detected event, a recognized situation, or a triggering event.

Clause 59. The method/system/software/device of the wireless monitoring system of clause 58: wherein at least one of: the reminder, or the notification, is communicated to at least one of: a user device of a user, a smart phone of the user, a tablet of the user, a computer of the user, a smart speaker, a smart device with a display, a smart device with a speaker, a key fob, a smart watch, a smart wearable, a smart display, a smart appliance, a smart device, a smart smoke detector, a smart door bell, a smart TV, a small surveillance camera, etc.

Clause 60. The method/system/software/device of the wireless monitoring system of clause 1: wherein at least one of: the reminder, or the notification is generated based on a time of the day, a day of the week, a day of the month, a day of the year, a location of a user device, a status of the system, an analysis of a historical record of at least one of: the TSCI, the STI and an analytics computed based on the STI, or a prediction based on machine learning.

Clause 61. The method/system/software/device of the wireless monitoring system of clause 7, further comprising: wherein at least one registered wirelessly detectable item is associated with the wireless monitoring system; generating a query, in a user-in-venue mode, if no motion is detected for a period of time and none of registered wirelessly detectable item is detected, a query is generated and communicated to a user device to ask whether the user wants to switch to a user-not-in-venue mode; if the user confirms, changing the operating mode from the user-in-venue mode to a user-not-in-venue mode.

Clause 62. The method/system/software/device of the wireless monitoring system of clause 7, further comprising: in a user-in-venue mode, changing the operating mode from the user-in-venue mode to a user-not-in-venue mode if no motion is detected for a period of time.

Clause 63. The method/system/software/device of the wireless monitoring system of clause 7, further comprising: in a user-in-venue mode, doing nothing if no motion is detected.

Clause 64. The method/system/software/device of the wireless monitoring system of clause 7, further comprising: wherein at least one registered wirelessly detectable item is associated with the wireless monitoring system; in a user-not-in-venue mode, if any registered wirelessly detectable item is detected, generate a notification to welcome the user.

Clause 65. The method/system/software/device of the wireless monitoring system of clause 7, further comprising: wherein at least one registered wirelessly detectable item is associated with the wireless monitoring system; in a user-not-in-venue mode, if any registered wirelessly detectable item is detected, changing the operating mode from the user-not-in-venue mode to a user-in-venue mode.

Clause 66. The method/system/software/device of the wireless monitoring system of clause 7, further comprising: wherein at least one registered wirelessly detectable item is associated with the wireless monitoring system; notifying the user if any registered wirelessly detectable item is detected.

Clause 67. The method/system/software/device of the wireless monitoring system of clause 1 or 2 or 3 or 4, further comprising: generating a notification if motion is detected and a motion satisfies an amplitude criterion and a duration criterion.

Clause 68. The method/system/software/device of the wireless monitoring system of clause 1 or 2 or 3 or 4, further comprising: generating a notification if motion is not detected and a motion satisfies an amplitude criterion and a duration criterion.

Clause 69. The method/system/software/device of the wireless monitoring system of clause 1 or 2 or 3 or 4, further comprising: generating a notification if motion is detected at a particular location.

Clause 70. The method/system/software/device of the wireless monitoring system of clause 1 or 2 or 3 or 4, further comprising: generating a notification to a set of designated users in the wireless monitoring system, except those who choose not to receive the notification.

Clause 71. The method/system/software/device of the wireless monitoring system of clause 1 or 2 or 3 or 4, further comprising: generating a notification to a set of designated users in the wireless monitoring system, except those who choose not to receive the notification.

Clause 72. The method/system/software/device of the wireless monitoring system of clause 1 or 2 or 3 or 4, further comprising: generating a notification to a set of designated users in the wireless monitoring system who choose receive the notification.

Clause 73. The method/system/software/device of the wireless monitoring system of clause 1 or 2 or 3 or 4, further comprising: in a user-not-in-venue mode, if motion is detected, waiting a delay time before raising an alarm.

Clause 74. The method/system/software/device of the wireless monitoring system of clause 1 or 2 or 3 or 4, further comprising: in a user-in-venue mode, if user elects to change to user-not-in-venue mode, waiting a delay time before changing the operating mode to the user-not-in-venue mode.

Clause 75. The method/system/software/device of the wireless monitoring system of clause 1 or 2 or 3 or 4, further comprising: in a user-in-venue mode, if user elects to change to user-not-in-venue mode, waiting a delay time before changing the operating mode to the user-not-in-venue mode.

Clause 76. The method/system/software/device of the wireless monitoring system of clause 1 or 2 or 3 or 4, further comprising: in a user-in-venue mode, if user elects to change to user-not-in-venue mode but fails to leave the venue with a delay time, waiting another delay time before changing the operating mode to the user-not-in-venue mode. For any of clauses 73-76, the delay time may be adjustable by the user. There may be associated sound or light display during the delay time. The pattern of the sound or light is also adjustable.

Clause 77. The method/system/software/device of the wireless monitoring system of clause 1 or 2 or 3 or 4, further comprising: filtering at least one of: the TSCI, the STI, or an analytics computed based on the TSCI or the STI, based on at least one of: a threshold or a parameter.

Clause 78. The method/system/software/device of the wireless monitoring system of clause 1 or 2 or 3 or 4, further comprising: recognizing a pattern based on the TSCI or the STI.

Clause 79. The method/system/software/device of the wireless monitoring system of clause 1 or 2 or 3 or 4, further comprising: controlling and managing the wireless monitoring system by a super user (SU) through a SU account of the system with highest authority levels and rights; creating and managing a number of regular user (RU) accounts for regular users by the SU through the SU account; configuring each RU account by the SU by at least one of: entering information of the regular user associated with the regular user account, assigning to the regular user account respective authority levels and rights with respect to the monitoring of the object motion based on the TSCI and the STI, wherein the respective authority levels and rights are less than or equal to the highest authority and rights of the SU, or assigning access to the task or a sub-task of the task.

Clause 80. The method/system/software/device of the wireless monitoring system of clause 79, further comprising: activating a particular regular user (RU) account for a particular RU by: sending an invitation to the particular RU based on the associated RU information entered by the SU, wherein the invitation is in the form of at least one of: an email to an email account of the particular RU, a message to a message account of the particular RU, an in-app message to an application (app) of the RU in a user device of the RU, wherein the application comprises at least one of: a text messaging app, a voice messaging app, a video messaging app, a conferencing app, an online chat app, an instant messaging app, an electronic mail app, a web based messaging system accessible by a web browser, a webpage providing text, voice, or video based messaging, a software with messaging capability in the form of at least one of: text, voice, image or video, a software with integrated text, voice or video messaging capability, or a software with conferencing capability, a text message to the user device of the RU, SMS, or MMS, receiving a response to the invitation from the RU, and activating the particular RU account based on the response.

Clause 81. The method/system/software/device of the wireless monitoring system of clause 80, further comprising: sending the invitation to the particular RU with a link to an account activation webpage, and accessing the account activation webpage by the particular RU using the link to enter required activation information of the particular RU.

Clause 82. The method/system/software/device of the wireless monitoring system of clause 79, further comprising: generating a particular response for a particular regular user (RU) to a third party based on the authority levels and rights of the particular RU.

Clause 83. The method/system/software/device of the wireless monitoring system of clause 79, further comprising: generating a particular response to a particular regular user (RU) based on the authority levels and rights of the particular RU.

Clause 84. The method/system/software/device of the wireless monitoring system of clause 83, further comprising: presenting at least a part of the particular response on a user device of the particular RU in accordance with the authority levels and rights associated with the particular RU.

Clause 85. The method/system/software/device of the wireless monitoring system of clause 79, further comprising: updating or terminating a particular RU account associated with a particular RU.

Clause 86. The method/system/software/device of the wireless monitoring system of clause 79, further comprising: enabling a particular regular user (RU) account to create, manage, update and terminate a limited number of dependent user (DU) accounts for dependent users associated with the particular RU, wherein the authority levels and rights of the DU accounts are less than or equal to that of the particular RU.

Clause 87. The method/system/software/device of the wireless monitoring system of clause 86, further comprising: managing any dependent user accounts created by the particular RU by the super user (SU), superseding the particular RU.

Clause 88. The method/system/software/device of the wireless monitoring system of clause 79, further comprising: upgrading a regular user (RU) account to be another super user (SU) account.

Clause 89. The method/system/software/device of the wireless monitoring system of clause 88, further comprising: downgrading a super user (SU) account to be a regular user (RU) account.

Clause 90. The method/system/software/device of the wireless monitoring system of clause 1 or 2 or 3 or 4: wherein the wireless monitoring system is interoperable with a third party system.

Clause 91. The method/system/software/device of the wireless monitoring system of clause 90: sharing at least one of: the STI, the monitoring of the object motion, an information of the task, and the response with the third party system.

Clause 92. The method/system/software/device of the wireless monitoring system of clause 90: enabling or configuring a device of the third party system to serve as another Type1 device to transmit another wireless signal to the Type2 device.

Clause 93. The method/system/software/device of the wireless monitoring system of clause 92: wherein the another wireless signal is transmitted by the device of the third party system in a manner compatible with the wireless monitoring system.

Clause 94. The method/system/software/device of the wireless monitoring system of clause 90: enabling or configuring a device of the third party system to serve as another Type2 device to receiving the wireless signal from the Type1 device.

Clause 95. The method/system/software/device of the wireless monitoring system of clause 94: enabling or configuring the device of the third party system to obtain another TSCI based on the received wireless signals; monitoring the object motion based on the another TSCI.

Clause 96. The method/system/software/device of the wireless monitoring system of clause 95: computing the STI based also on the another TSCI.

Clause 97. The method/system/software/device of the wireless monitoring system of clause 95: computing another STI based on the another TSCI; monitoring the object motion based on the another STI.

Clause 98. The method/system/software/device of the wireless monitoring system of clause 90: enabling or configuring a first device of the third party system to serve as another Type1 device to transmit another wireless signal.

Clause enabling or configuring a second device of the third party system to serve as another Type2 device to receiving the another wireless signal from the another Type1 device.

Clause 99. The method/system/software/device of the wireless monitoring system of clause 98: obtaining another TSCI based on the another wireless signal; monitoring the object motion based on the another TSCI.

Clause 100. The method/system/software/device of the wireless monitoring system of clause 99: computing the STI based also on the another TSCI.

Clause 101. The method/system/software/device of the wireless monitoring system of clause 99: computing another STI based on the another TSCI; monitoring the object motion based on the another STI.

Clause 102. The method/system/software/device of the wireless monitoring system of clause 90: enabling a device of the third party system to assist in the computation of the STI based on the TSCI.

Clause 103. The method/system/software/device of the wireless monitoring system of clause 90: enabling a device of the third party system to assist in monitoring the object motion based on the TSCI and the STI.

Clause 104. The method/system/software/device of the wireless monitoring system of clause 90: enabling a device of the third party system to assist in performing the task based on the monitoring.

Clause 105. The method/system/software/device of the wireless monitoring system of clause 90: enabling a device of the third party system to assist in performing the task based on the monitoring.

Clause 106. The method/system/software/device of the wireless monitoring system of clause 90: enabling a device of the third party system to assist in generating the response based on the task.

Clause 107. The method/system/software/device of the wireless monitoring system of clause 1 or 2 or 3 or 4: computing the STI based on the TSCI in real time; monitoring the object motion based on the TSCI and the STI in real time; performing the task based on the monitoring in real time; and generating the response based on the task in real time.

Clause 108. The method/system/software/device of the wireless monitoring system of clause 1 or 2 or 3 or 4: computing a location of the object motion based on the TSCI and the STI.

Clause 109. The method/system/software/device of the wireless monitoring system of clause 1 or 2 or 3 or 4: determining based on the TSCI and the STI whether there is object motion or no object motion in real time.

Clause 110. The method/system/software/device of the wireless monitoring system of clause 1 or 2 or 3 or 4: generating a presentation of a history, a trend or a temporal summary of at least one of: the STI, the monitoring of object motion, a location of the object motion, an information of the object motion, a motion analytics computed based on the STI or the TSCI, the task or the response, associated with a time period.

Clause 111. The method/system/software/device of the wireless monitoring system of clause 1 or 2 or 3 or 4: wherein the first wireless signal is transmitted and the second wireless signal is received based on a standard, format/frame/protocol of the standard, field/format of the frame, data frame, control frame, management frame, physical layer protocol data unit (PPDU), MAC protocol data unit (WPDU/A-PDU), sounding frame, beacon frame, probe frame, notification frame, request frame, response frame, acknowledgement frame, excitation frame, null data frame, null data packet (NDP), response to an NDP, response to null data frame, international standard, national standard, industry standard, defacto standard, protocol, handshake, signaling, data communication standard, wireless local/wide area network standard, mesh network standard, mobile communication standard, cellular standard, ultra-wide band (UWB) standard, Wi-Fi standard, IEEE 802.11/15/16 standard, IEEE 802.11n/ac/ax/be/bf standard, 3G/4G/LTE/5G/6G/7G/8G standard, Bluetooth, BLE, ZigBee, NFC, or WiMax. A wireless signal from a Type1 device to a Type 2 device may be a response to another signal (e.g. a triggering signal) from the Type2 device to the Type1 device.

In some embodiments, there may be a number of candidate wireless signals (with corresponding system settings such as carrier frequency, bandwidth, signal type, signal characteristics, PHY/MAC level signaling, modulation, data rate, signaling timing, sounding frequency, spatial streams, feedback, etc) that can be transmitted from the Type1 device to the Type2 device such that the TSCI (e.g. of sufficient quality for the STI, object motion monitoring and/or task) can be obtained/extracted from the candidate wireless signal. A qualification test between the Type1 device and the Type2 device may be performed on the number of candidate wireless signals to ensure they are satisfactory or qualified for the task, the monitoring of object motion based on STI, and/or the computation of STI based on TSCI. The qualification test may comprise more than one sub-tests, e.g. a sub-test on signal-to-noise ratio/SNR of wireless signal, a sub-test on SNR of STI, a sub-test on time consistency or variability of STI, or a sub-test on a behavior of TSCI/STI when the object motion is a certain testing object motion, etc. One of the candidate wireless signals may be chosen as the wireless signal. If there are more than one tasks, there may be more than one qualification tests, one for each task. Some tasks may share the same qualification test. Alternatively, the tasks may be classified into some task classes (categories), each associated with a corresponding qualification test. A pair of Type1 device and Type2 device with associated wireless signal may be qualified for one task, but not (necessarily) qualified for another task.

More than one wireless signals may be transmitted/received in a synchronous, simultaneous, contemporaneous, asynchronous, dependent, independent, coordinated, un-coordinated, cooperative, uncooperative manner, possibly in accordance with the standard or the protocol (e.g. by more than one Type1 devices, and/or more than one Type2 devices). The more than one wireless signals may be of the same or different signal types (e.g. one may be an enquiry, or announcement while another one may be an acknowledge; it may be point-to-point/unicast, point-to-multipoint/multicast/broadcast/, multipoint-to-point, multipoint-to-multipoint, OFDMA, MU-MIMO, or BSS coloring)/frame structure (e.g. various data/control/management frame structures)/signal characteristics (e.g. various carrier frequency, bandwidth, modulation, header/preamble structure, sounding timing/frequency).

Clause 112. The method/system/software/device of the wireless monitoring system of clause 1 or 2 or 3 or 4: wherein any wireless signal is transmitted by the respective Type1 device and received by respective Type2 device in a sensing session. The sensing session may be in accordance to a standard or a protocol.

Clause 113. The system/software/device of the wireless monitoring system of clause 112: wherein the sensing session is initiated by an initiating device which may be any Type1 device, Type2 device or another device. The sensing session may be initiated by the initiating device (e.g. sensing initiator) in accordance to the standard or the protocol. The initiating device may send or broadcast an initiating request to the Type1 devices or Type2 devices. All (responding) Type1 or Type2 devices joining the sensing session may respond to the initiating request to join the sensing session.

Clause 114. The system/software/device of the wireless monitoring system of clause 113: wherein a number of responding devices respond to an initiation request from the initiating device to join the sensing session. All Type2 devices may respond to join. One, some or all of the Type1 device(s) may respond to join. A sensing responder may be any device (e.g. Type1 or Type2 device) that responds to the initiation request and joins the sensing session.

One (or more) particular Type1 device may not respond to the initiation request (e.g. because it does not support 802.11bf) to join the session formally. The particular (non-responding) Type1 device may still contribute in the session by being "guided" by a particular Type2 device (that responded to the initiation request and joined the session) to send the wireless signal to the particular Type2 device, in response to a triggering wireless signal from the particular Type2 device (e.g. the triggering signal may be a data/ control/management frame signal, and the wireless signal may be an acknowledge to the triggering signal). The particular Type2 device may obtain/extract TSCI based on/from the wireless signal, compute the STI, monitor the object motion based on the TSCI/STI, perform the task based on the monitoring and generate the response based on the task. The particular (non-responding) Type1 device may be a contributing device in the session.

The particular Type1 device and the particular Type2 device may be authenticated or associated (e.g. the particular Type2 device may be a wireless access point/router/repeater and the particular Type1 device may be associated or authenticated in a wireless network of the particular Type2 device). The particular Type2 device may determine/comprise at least one candidate triggering signal(s) with associated system settings (e.g. carrier frequency, bandwidth, sounding rate). The at least one candidate triggering signal may be compliant to a wireless standard or protocol. The Type2 device may test the Type1 device in response to the initiating request. The Type2 device may perform a qualification test of the Type1 device (or any authenticated or associated devices) for the task and each of the candidate triggering signals/settings to see if any/all of the candidate triggering signals/settings are qualified, and to see if the Type1 device is qualified. The Type2 device may send the at least one candidate triggering signal(s) to the Type1 device. The Type2 device may receive at least one response signal from the Type1 device, each in response to a respective candidate triggering signal.

The Type2 device may choose one of the candidate triggering signal(s) with a received response signal as the triggering signal. The Type2 device may make the choice based on a requirement or criteria (e.g. with respect to timing, frequency, sounding frequency, period, delay/lag, signal strength, bandwidth, number of antenna, channel condition/congestion/traffic, successful/unsuccessful reception of the wireless signal, time delay between the transmitted candidate signal and the received wireless signal) associated with at least one of: the object motion, the monitoring of the object motion or the task. It may report the existence of the Type1 device that can function as a possible contributing device (a contributing Type1 device) in the session.

The Type2 device may maintain a list of possible contributing device(s) for each of a number of tasks (e.g. motion detection, presence detection, breathing monitoring, heartbeat monitoring, fall-down detection, motion localization, tracking, activity monitoring, gesture/gait/activity recognition, a first task using a first feature/statistics/algorithm/approach w.r.t. the TSCI, a second task with the same goal as the first task but using a second feature/statistics/algorithm/approach w.r.t. the TSCI). The Type2 device may obtain information of the tasks and the requirement/criteria associated with each task, from a server.

There may be a number of tasks classified into a number of task classes/categories. The Type2 device may maintain a list of possible contributing device(s) for each of the number of task classes/categories. A requirement or criteria may be associated with each task class/category.

Clause 115. The system/software/device of the wireless monitoring system of clause 114: wherein the responding devices comprise all Type2 devices in the session.

The computation of the STI, the monitoring of an object motion and/or the performance of the task may be in a separate, individual, or independent manner based on a TSCI associated with a pair of Type1 device and Type2 device, or may be in a jointed, combined, fused, hybrid, or inter-dependent manner based on more than one TSCI associated with more than one pair of Type1 and Type2 devices. Any Type1 device may be a responding device (responded to initiating request to join the session) or a contributing device (did not respond to initiating request to join the session but was guided by the Type2 device to transmit the wireless signal). Joint monitoring may be based on more than one individual STI each computed individually based on TSCI associated with one pair of Type1 and Type2 devices, or a joint STI computed jointly based on multiple TSCI associated with multiple pairs of Type1 and Type2 devices, or a combination of individual STI and joint STI. In the computation of a joint STI in the joint monitoring, TSCI associated with a contributing Type1 device (e.g. smaller weight) may be weighted differently from TSCI associated with a responding Type1 device (e.g. larger weight). In the joint monitoring, individual STI associated with a contributing Type1 device (e.g. smaller weight) may be weighted differently from individual STI associated with a responding Type1 device (e.g. larger weight).

Clause 116. The system/software/device of the wireless monitoring system of clause 114: wherein the responding devices comprise zero, one, more than one, or all, of the Type1 devices. The responding devices may comprise additional devices that are not Type1 or Type2 devices. The additional device may perform computation, storage, processing or some role/subtask for/in the wireless monitoring.

Any wireless signal(s) may be a train of wireless probe signals transmitted/received for sensing measurement. Each CI may be any sensing measurement obtained based on a respective received probe signal. Each Type1 device may be a sensing transmitter. Each Type2 device may be a sensing receiver. A device may take on multiple roles (e.g. both as a Type1 device and a Type2 device) in a sensing session. The initiating device may be a Type1 device, or Type2 device, or both, or neither.

Clause 117. The system/software/device of the wireless monitoring system of clause 112: wherein the sensing session comprises one or more instances of pause period in which the wireless signal has zero transmission. The wireless signal is not active/transmitted from the Type1 device to the Type2 device during the pause period(s). Different pause periods may have different time durations. A pause period can be an extended period of time (e.g. magnitude in the order of century, decade, year, month, week, day, hour, minute, second or fraction of a second).

Clause 118. The system/software/device of the wireless monitoring system of clause 112: wherein the sensing session comprises one or more burst instances of active sensing measurements. In other words, in a sensing session, sensing measurements may be performed for a first period of time, suspended/paused/stopped for a second period of time, then resumed/restarted for a third period of time, and so on.

Clause 119. The system/software/device of the wireless monitoring system of clause 112: wherein the sensing session comprises at least one of: a setup phase, an operating phase, and a termination phase. The sensing session may be in response to a sensing request for the task by a user or user device.

Clause 120. The system/software/device of the wireless monitoring system of clause 119 further comprising at least one of the following in the set up phase: establishing or re-establishing the sensing session by the initiating device; communicating an initiating request by an initiating device to each Type1 device or Type2 device; transmitting a response by a Type1 device or a Type2 device to the respective initiating request to join the session; communicating supported operational parameters of the Type1 device or the Type2 device; performing a qualification test of the Type1 device, the Type2 device or both; reporting by the Type2 device the existence of the Type1 device and the suitability and capability of the Type1 device to transmit the wireless signal to the Type2 device to generate TSCI; pairing/associating/linking the Type1 device and the Type2 device for the transmission and reception of the wireless signal in the sensing session; negotiating/choosing/defining operational parameters of the Type1 device or the Type2 device associated with the sensing session based on the communicated supported operational parameters and the qualification test; or configuring each Type1 device or Type2 device based on the chosen operational parameters.

The operational parameters may include any of: carrier frequency, bandwidth, choice of the wireless signal from a number of candidate wireless signals, system settings, signal power, signaling timing, sounding frequency, choice/precision/quantity of CI, etc. The supported operational parameters may be communicated between the Type1 device and Type2 device, or between each Type1 (or Type2) device and the initiating device.

Clause 121. The system/software/device of the wireless monitoring system of clause 119 further comprising at least one of the following in the operating phase: (i) transmitting the wireless signal from the Type1 device to the Type2 device; (ii) obtaining the TSCI from the wireless signal; (iii) reporting the TSCI obtained from the wireless signal; (iv) computing the STI based on the TSCI; (v) reporting the STI; (vi) monitoring the object motion based on the STI; (vii) performing the task based on the monitoring of the object motion; (viii) generating the response based on the task; reporting the response. Steps (i) and (ii) may be considered as a low-level measurement phase or sub-phase. Step (iii) may be considered a low-level reporting phase or sub-phase (e.g. from low-level to another low-level, or from low-level to high-level). Steps (iv) to (viii) may be considered high-level processing phase or sub-phase.

In one example, the TSCI may be extracted/obtained in Step (ii) by the Type2 device (e.g. a wireless integrated circuit/IC/semiconductor of the Type2 device) from the wireless signal. The reporting in Step (iii) may comprise a transmission (wireless or wired) of the TSCI (in a certain form; perhaps with a certain precision; perhaps compressed) from the Type2 device to another device (e.g. Type1 device, or initiating device). If it is wireless transmission in Step (iii), it may be transmitted from the wireless IC of the Type2 device (using antennas of the Type2 device) to another wireless IC of the another device (using its antennas)—which may be a low-level to low-level reporting, at PHY level or MAC level. Steps (iv) to (viii) may be performed by the another device or yet another device. Step (v) may/may not be skipped.

In another example, the TSCI may be extracted/obtained in Step (ii) by the Type2 device (e.g. a wireless integrated circuit/IC/semiconductor of the Type2 device) from the wireless signal. The reporting in Step (iii) may be done internally in the Type2 device. It may be a low-level to high-level reporting: from a low level (e.g. PHY/MAC layer, firmware) to an upper level (e.g. Application layer, user application/software). Step (iii) may be skipped. Step (iv) may be done in the Type2 device (e.g. at Application layer, or PHY/MAC layer). In Step (v), the STI may be reported by the Type2 device to another device (e.g. the initiating device, Type1 device or a server). Steps (vi) to (viii) may be performed by the Type2 device, another device or yet another device in a separate, joint or cooperative manner.

Clause 122. The system/software/device of the wireless monitoring system of clause 121 further comprising at least one of the following in the termination phase: stopping the transmission of the wireless signal; stopping the obtaining of TSCI from the wireless signal; stopping the computation of STI based on TSCI; stopping the monitoring of object motion based on STI/TSCI; stopping the task; or stopping the response.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for wireless motion monitoring, comprising:
a transmitter configured for transmitting a first wireless signal through a wireless multipath channel of a venue;
a receiver configured for receiving a second wireless signal through the wireless multipath channel, wherein the second wireless signal differs from the first wireless signal due to the wireless multipath channel and a motion of an object in the venue; and
a processor configured for:
choosing a current operating mode from a plurality of supported operating modes associated with a task and the motion of the object,
determining at least one aspect of the object to be monitored in the current operating mode, wherein each aspect of the object is to be monitored in a respective time period of the time table,
obtaining a time series of channel information (TSCI) of the wireless multipath channel based on the second wireless signal,
computing a spatial-temporal information (STI) based on the TSCI,
filtering out any forgettable activities from the TSCI and the STI,
monitoring the at least one aspect of the object based on the TSCI and the STI, wherein the current operating mode is switchable to another operating mode of the plurality of supported operating modes automatically based on: a pre-setting of the system, the monitoring of the motion of the object, and the current operating mode,
performing the task based on the monitoring and the current operating mode,
generating a response to the motion of the object based on the current operating mode of the task, wherein the response to the motion of the object is different when the current operating mode becomes a different operating mode, and
in accordance with a determination that (1) the current operating mode is a user-away mode for monitoring the venue when a user of the system is not present in the venue and (2) the object, being a potential intruder, is detected based on the TSCI and the STI:
conducting an interrogation dialog with the potential intruder using either a speaker or a visual display as an output device, and either a microphone or a keypad as an input device,
challenging the potential intruder by requesting a passcode, a password, or an identification within a time limit,
giving a warning animation to the potential intruder when the potential intruder fails to input a valid passcode, password or identification within the time limit, and
giving a welcome animation to the user when the potential intruder inputs the valid passcode, password or identification within the time limit as an indication to be the user.

2. The system of claim 1, wherein the processor is further configured for:
determining a mode of notification for the user based on the current operating mode.

3. The system of claim 2, wherein:
the current operating mode is a user-away mode for monitoring the venue when the user of the system is not present in the venue; and
the processor is further configured for:
configuring the monitoring of the at least one aspect of the object to be associated with the user-away mode, with the object being an intruder;
monitoring the TSCI and the STI for patterns pointing to a presence of the intruder; and
configuring the response to comprise at least one of:
sending a notification to a designated user,
generating an alarm,
generating an alarm animation,
playing a warning message,
conducting a dialog with the intruder,
requesting the intruder to produce an identification of any authorized user,
sounding a siren of the system, or
securing the venue.

4. The system of claim 2, wherein:
the current operating mode is a user-in-venue mode for monitoring the venue when the user of the system is present in the venue; and
the processor is further configured for:
configuring the monitoring of the at least one aspect of the object to be associated with the user-in-venue mode, with the object being the user;
monitoring activities of the user in the venue based on the TSCI and the STI; and
configuring the response to comprise at least one of:
locating the user,
monitoring movement of the user,
monitoring at least one of: a daily routine, a habit or a behavior, of the user,
monitoring any deviation from at least one of: the daily routine, the habit or the behavior, of the user,
detecting an additional user,
monitoring movement of the additional user,
monitoring a behavior of the additional user,
monitoring interaction between the user and the additional user,
detecting dangerous motion of the user,
detecting a fall-down of the user,
monitoring a vital sign of the user,
monitoring at least one of: a breathing or a heartbeat, of the user;
monitoring a sleeping of the user,
monitoring at least one of: a motion sequence, a dancing, an exercising, a pacing, a pause, or a resting, of the user,
detecting a gesture of the user,
conducting a dialog, an exchange or an interaction with the user, conducting a notification, a report or a reminder to the user,
directing at least one user device to conduct the dialog, exchange, interaction, notification, report or reminder,
generating at least one presentation or user-interface on the at least one user device in the dialog, exchange, interaction, notification, report or reminder,
verifying a danger, a fall-down, an event, a situation, a condition, a gesture, a command of the user based on the dialog, exchange, or interaction, or
communicating an information of the activities of the user to at least one of: another user, another user device of the another user, a server, a cloud server, a local server, a storage, a network storage, a distributed storage, a block chain, a database, or an analysis module.

5. The system of claim 2, wherein:
the current operating mode is a vigilant mode for monitoring the venue when the user of the system is not present in the venue and the user does not want siren; and
the processor is further configured for:
configuring the monitoring of the at least one aspect of the object to be associated with the vigilant mode, with the object being an intruder;
monitoring the TSCI and the STI for patterns pointing to a presence of the intruder, wherein the response comprises at least one of:
sending a notification to a designated user,
generating an alarm,
generating an alarm animation,
playing a warning message,
conducting a dialog with the intruder,
requesting the intruder to produce an identification of the authorized user,
sounding a siren of the system, or
securing the venue; and
configuring the response to exclude at least one of:
generating an alarm,
generating an alarm animation,
playing a warning message,
conducting a dialog with the intruder,
requesting the intruder to produce an identification of any authorized user,
sounding a siren of the system, or
securing the venue.

6. The system of claim 2, wherein:
the current operating mode is a guard mode for monitoring the venue when the user of the system is not present in the venue and the user wants to be notified of any detected object motion; and
the processor is further configured for:
configuring the monitoring of the at least one aspect of the object to be associated with the guard mode, with the object being an intruder;
monitoring the TSCI and the STI for patterns pointing to a presence of the intruder; and
configuring the response to comprise at least one of:
sending a notification to the user,
taking further action upon a confirmation from the user, or
switching to another operating mode.

7. The system of claim 2, wherein:
the current operating mode is a power-saving mode for monitoring the venue; and
the processor is further configured for pausing or stopping at least one of:
the transmitting of the first wireless signal from the transmitter,
the receiving of the second wireless signal by the receiver,
the obtaining of the TSCI based on the second wireless signal,
the computing of the STI based on the TSCI,
the monitoring of the motion of the object based on the TSCI and the STI,
the performing of the task, or
the generating of the response based on the task.

8. The system of claim 2, wherein:
the current operating mode is: (a) a user-challenge mode for monitoring the venue when the motion of the object is detected in the venue and the object is unidentified or (b) a user-interactive mode for monitoring the venue when the object is a user; and
the processor is further configured for:
configuring the response in the user-challenge mode to comprise at least one of:
sending a notification to a designated user,
generating an alarm,
generating an alarm animation,
playing a warning message,
conducting a dialog with the intruder,
requesting the object to produce an identification of any authorized user,
securing the venue, or
switching to another operating mode;
configuring the response in the user-interactive mode to comprise at least one of:
conducting a dialog, an exchange or an interaction with the user,
conducting a notification, a report or a reminder to the user,
directing at least one user device to conduct the dialog, exchange, interaction, notification, report or reminder,
generating at least one presentation or user-interface on the at least one user device in the dialog, exchange, interaction, notification, report or reminder,
verifying at least one of: a danger, a fall-down, an event, a situation, a condition, a sleep-related condition, an activity, a dancing, an exercising, a pacing, a resting, a deviation from at least one of: a daily routine, a habit or a behavior, a movement, a gesture, or a command of the user based on the dialog, exchange, or interaction, or
communicating an information of the activities of the user to at least one of: another user, another user device of the another user, a server, a cloud server, a local server, a storage, a network storage, a distributed storage, a block chain, a database, or an analysis module; and
monitoring the motion of the object in reaction to the response.

9. The system of claim 2, wherein the processor is further configured for changing the current operating mode of the task from the operating mode to a different operating mode of the supported operating modes based on at least one of:
a choice of a user of the system,
a preference of the user,
an input on a user device by the user,
a selection on a user-interface (UI) by the user, a button press on the UI by the user,
a verbal selection by the user,
a presentation to the user,
a presentation on the UI,
a dialog, an exchange or an interaction with the user,
the dialog, exchange or interaction based on the user device,
a finite state machine (FSM) comprising at least one state each associated with a respective supported operating mode,
a finite state machine (FSM) comprising a state associated with a sequence of supported operating modes,
the at least one aspect of the object being monitored,
a time table associated with at least one of: the task, the user, the object, or the venue,
a presence or absence of the user in the venue,
a communication with another system,
a power-on, a power interruption, a system reset, or
a power saving need of the system.

10. The system of claim 9, wherein the processor is further configured for:
associating at least one registered wirelessly detectable item with the system;
generating at least one of: a query, a presentation, a notification, a dialog, an exchange, or an interaction in a user-in-venue mode, when no motion is detected for a period of time and none of the at least one registered wirelessly detectable item is detected, wherein the query is communicated to the user device to ask whether the user has an intent of switching to a user-away mode; and
changing the current operating mode of the task from the user-in-venue mode to the user-away mode after the user confirms the switching or after the user fails to decline the switching within a time-out period.

11. The system of claim 9, wherein the processor is further configured for:
in a user-in-venue mode, changing the current operating mode of the task from the user-in-venue mode to a user-away mode after no motion is detected for a period of time.

12. The system of claim 9, wherein the processor is further configured for:
associating at least one registered wirelessly detectable item with the system;
generating a notification, a greeting, a dialog, an exchange, an interaction, or a presentation to welcome the user in a user-away mode, when any of the at least one registered wirelessly detectable item is detected; and
changing the current operating mode of the task from the user-away mode to a user-in-venue mode, when any of the at least one registered wirelessly detectable item is detected.

13. The system of claim 9, wherein the processor is further configured for:
when a motion is detected in a user-away mode, waiting for a predetermined time period before raising an alarm.

14. The system of claim 9, wherein the processor is further configured for:
when the user chooses to switch the current operating mode from a user-in-venue mode to a user-away mode, waiting for a predetermined time period before changing the current operating mode to the user-away mode.

15. The system of claim 9, wherein the processor is further configured for:
when the user chooses to switch the current operating mode from a user-in-venue mode to a user-away mode but fails to leave the venue within a predetermined time period, waiting for an additional predetermined time period before changing the current operating mode to the user-away mode.

16. The system of claim 1, wherein the processor is further configured for:
receiving an emergency message; and
performing at least one of the following emergency actions based on the emergency message:
conducting a dialog, an exchange or an interaction with a user of the system,
conducting a notification, a report or a reminder to the user,
directing at least one user device of the user to conduct the dialog, exchange, interaction, notification, report or reminder,
generating at least one presentation or user-interface on the at least one user device in the dialog, exchange, interaction, notification, report or reminder,
verifying an emergency associated with the emergency message, a danger, a fall-down, an event, a situation, a condition, a gesture, a command of the user based on the dialog, exchange, or interaction,
initiating an evacuation,
actuating an emergency warning system,
mobilizing an emergency response system,
turning on an emergency lighting,
triggering an emergency broadcasting system,
setting off an emergency messaging system,
activating a priority notification system,
sounding a siren,
sounding an audio alarm,
displaying a visual alarm,
animating an animated alarm,
generating a notification or personalized alarm to at least one of: a user of the system, one or more designated contact person,
requesting an emergency service, or
requesting a dispatch of at least one first responder to at least one of: the venue, a designated location, a home address of the user, or a current location of the user.

17. The system of claim 1, wherein:
the transmitter is located at a first device;
the receiver is located at a second device;
at least one of the first device or the second device is a device having a single role in the system; and
the processor is further configured for changing one of the first device and the second device in the system based on at least one of: a software update, firmware update, software upgrade, or over-the-air software upgrade.

18. The system of claim 17, wherein:
at least one of the first device or the second device is communicatively coupled with at least one of: a wired network or a wireless network;
at least one of the first device or the second device comprises at least one of: an audible alarm generator, a dialogue generator, a conversation engine, a siren, a bell, a speaker, a status indicator, a pathway sound indicator, a location sound indicator, a light, a pathway light for safety, a colored light, an alarm light, a warning light, or a timed light; and
the processor is further configured for setting up the first device and the second device according to one of the following manners:

the second device is set up before the first device,
the first device is set up before the second device, or
the first device and the second device are set up at the same time.

19. The system of claim 17, wherein:
the processor is further configured for generating a label for at least one of:
the first device, a location associated with the first device, a region associated with the first device,
the second device, a location associated with the second device, a region associated with the second device,
a pair of the first device and the second device,
a location associated with the pair, or
a region associated with the pair; and
the label is generated based on at least one of:
an input of a user of the system during a set-up stage of the system,
the TSCI, the STI, the task, or the response after the set-up stage.

20. The system of claim 1, wherein:
the venue comprises at least one of:
a floor of a multi-floor structure,
a plurality of floors of the multi-floor structure,
an interior space of a structure, or
an immediate neighboring exterior space of the structure; and
the processor is further configured for:
generating a presentation related to the monitoring for a user-interface (UI) of a user device of a user of the system; and
obtaining a user input from the user via the UI.

21. The system of claim 1, wherein the task comprises at least one of:
generating at least one of: a presentation, a reminder, a notification, a report, a dialog, an exchange or an interaction based on at least one of: a scheduled event, an unread message, an unread news item, a schedule, a time table, subscribed channel news, a user setting, an event, an alarm clock, or a situation; or
changing a mode of the system based on at least one of: the motion of the object, the STI, a plan, a time table, a condition, a detected event, a recognized situation, or a triggering event.

22. The system of claim 21, wherein:
at least one of the presentation, the reminder, the notification, the report, the dialog, the exchange, the interaction, or the mode is communicated to at least one of:
a user device of a user, a smart phone of the user, a tablet of the user, a computer of the user, a smart speaker, a smart device with a display, a smart device with a speaker, a key fob, a smart watch, a smart wearable, a smart display, a smart appliance, a smart device, a smart smoke detector, a smart door bell, a smart TV, or a small surveillance camera; and
at least one of the reminder, the notification, the report, the dialog, the exchange, the interaction, or the mode is determined based on at least one of: a time in a day, a day in a week, a day in a month, a day in a year, a location of a user device, a status of the system, a prediction based on machine learning, or an analysis of a historical record of at least one of: the TSCI, the STI or an analytics computed based on the STI.

23. The system of claim 1, wherein the processor is further configured for generating a reminder, a notification, a report, a dialog, an exchange, or an interaction to/with at least one designated user, based on at least one of:

a motion is detected and satisfies an amplitude criterion and a duration criterion; or
a motion is detected at a predetermined location in the venue.

24. The system of claim 1, wherein the processor is further configured for:
filtering at least one of: the TSCI, the STI, or an analytics computed based on the TSCI or the STI, based on at least one of: a threshold or a parameter; and
recognizing a pattern based on the TSCI or the STI.

25. The system of claim 1, wherein the processor is further configured for:
generating a super user (SU) account for a SU to control and manage the system with highest authority levels and rights;
generating a plurality of regular user (RU) accounts each for a respective RU to control and manage the system; and
configuring each RU account based on at least one of the following performed by the SU:
entering information of the RU associated with the RU account,
assigning to the RU account respective authority levels and rights with respect to monitoring the motion of the object based on the TSCI and the STI, wherein the respective authority levels and rights are less than or equal to the highest authority levels and rights of the SU, or
assigning to the RU account an access to the task or a sub-task of the task.

26. The system of claim 1, wherein:
the system is interoperable with a third party system; and
the processor is further configured for:
sharing with the third party system at least one of: the STI, the monitoring of the motion of the object, an information of the task, or the response; and
enabling or configuring a device in the third party system to serve as an additional transmitter to transmit an additional wireless signal to the receiver in the system.

27. The system of claim 1, wherein the processor is further configured for:
computing a location of the motion of the object based on the TSCI and the STI;
determining, based on the TSCI and the STI, whether there is object motion in real time; and
generating a presentation of a history, a trend or a temporal summary of at least one of: the STI, the task or the response, the monitoring of the motion, a location of the motion, a motion analytics computed based on the STI or the TSCI, associated with a time period.

28. A method of a wireless monitoring system, comprising:
transmitting, by a transmitter in the wireless monitoring system, a first wireless signal through a wireless multipath channel of a venue;
receiving, by a receiver in the wireless monitoring system, a second wireless signal through the wireless multipath channel, wherein the second wireless signal differs from the first wireless signal due to the wireless multipath channel and a motion of an object in the venue;
choosing a current operating mode from a plurality of supported operating modes associated with a task;
determining at least one aspect of the object to be monitored in the current operating mode, wherein each aspect of the object is to be monitored in a respective time period of the time table;

obtaining a time series of channel information (TSCI) of the wireless multipath channel based on the second wireless signal;

computing a similarity score based on a pair of temporally adjacent CI of the TSCI;

computing a spatial-temporal information (STI) based on the TSCI;

filtering out any forgettable activities from the TSCI and the STI;

monitoring the at least one aspect of the object based on the TSCI and the STI, wherein the current operating mode is switchable to another operating mode of the plurality of supported operating modes automatically based on: a pre-setting of the wireless monitoring system, the monitoring of the motion of the object, and the current operating mode;

performing the task based on the monitoring and the current operating mode;

generating a response to the motion of the object based on the current operating mode of the task, wherein the response to the motion of the object is different when the current operating mode becomes a different operating mode; and in accordance with a determination that (1) the current operating mode is a user-away mode for monitoring the venue when a user of the system is not present in the venue and (2) the object, being a potential intruder, is detected based on the TSCI and the STI:

conducting an interrogation dialog with the potential intruder using either a speaker or a visual display as an output device, and either a microphone or a keypad as an input device, challenging the potential intruder by requesting a passcode, a password, or an identification within a time limit, giving a warning animation to the potential intruder when the potential intruder fails to input a valid passcode, password or identification within the time limit, and giving a welcome animation to the user when the potential intruder inputs the valid passcode, password or identification within the time limit as an indication to be the user.

29. The method of claim 28, further comprising:
determining a mode of notification for the user based on the current operating mode.

30. A wireless device of a wireless monitoring system, comprising:
a processor;
a memory communicatively coupled to the processor; and
a receiver communicatively coupled to the processor, wherein:
an additional wireless device of the wireless monitoring system is configured for transmitting a first wireless signal through a wireless multipath channel of a venue in accordance with a current operating mode, the receiver is configured for receiving a second wireless signal through the wireless multipath channel in accordance with the current operating mode, the second wireless signal differs from the first wireless signal due to the wireless multipath channel and a motion of an object in the venue, and the processor is configured for:
choosing the current operating mode from a plurality of supported operating modes associated with a task and the motion of the object, determining at least one aspect of the object to be monitored in the current operating mode, wherein each aspect of the object is to be monitored in a respective time period of the time table, obtaining a time series of channel information (TSCJ) of the wireless multipath channel based on the second wireless signal, computing a spatial-temporal information (STI) based on the TSCI, filtering out any forgettable activities from the TSCI and the STI, monitoring the at least one aspect of the object based on the current operating mode, the TSCI and the STI, wherein the current operating mode is switchable to another operating mode of the plurality of supported operating modes automatically based on: a pre-setting of the wireless monitoring system, the monitoring of the motion of the object, and the current operating mode, performing the task based on the monitoring and the current operating mode, generating a response to the motion of the object based on the current operating mode of the task, wherein the response to the motion of the object is different when the current operating mode becomes a different operating mode, and in accordance with a determination that (1) the current operating mode is a user-away mode for monitoring the venue when a user of the system is not present in the venue and (2) the object, being a potential intruder, is detected based on the TSCI and the STI:

conducting an interrogation dialog with the potential intruder using either a speaker or a visual display as an output device, and either a microphone or a keypad as an input device, challenging the potential intruder by requesting a passcode, a password, or an identification within a time limit, giving a warning animation to the potential intruder when the potential intruder fails to input a valid passcode, password or identification within the time limit, and giving a welcome animation to the user when the potential intruder inputs the valid passcode, password or identification within the time limit as an indication to be the user.

* * * * *